United States Patent
Kazmi et al.

(10) Patent No.: US 9,763,265 B2
(45) Date of Patent: Sep. 12, 2017

(54) METHODS FOR MANAGING INTERRUPTIONS WITH MULTIPLE DEACTIVATED SCELLS

(71) Applicant: Telefonaktiebolaget LM Ericsson (publ), Stockholm (SE)

(72) Inventors: Muhammad Kazmi, Bromma (SE); Christopher Callender, Kinross (GB); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 266 days.

(21) Appl. No.: 14/649,456

(22) PCT Filed: Mar. 24, 2015

(86) PCT No.: PCT/SE2015/050351
§ 371 (c)(1),
(2) Date: Jun. 3, 2015

(87) PCT Pub. No.: WO2015/147736
PCT Pub. Date: Oct. 1, 2015

(65) Prior Publication Data
US 2016/0302228 A1    Oct. 13, 2016

Related U.S. Application Data

(60) Provisional application No. 61/969,700, filed on Mar. 24, 2014.

(51) Int. Cl.
*H04W 74/00* (2009.01)
*H04L 1/18* (2006.01)
*H04L 5/00* (2006.01)

(52) U.S. Cl.
CPC ......... *H04W 74/004* (2013.01); *H04L 1/1887* (2013.01); *H04L 5/0055* (2013.01)

(58) Field of Classification Search
CPC .................................................. H04W 74/004
See application file for complete search history.

(56) References Cited

U.S. PATENT DOCUMENTS

2012/0176947 A1    7/2012  Xi et al.
2013/0208587 A1*   8/2013  Bala ...................... H04W 16/14
                                                370/230

(Continued)

FOREIGN PATENT DOCUMENTS

WO    2008023945 A1    2/2008
WO    2008133454 A1    11/2008

OTHER PUBLICATIONS

International Search Report and Written Opinion dated Jun. 24, 2015 for International Application Serial No. PCT/SE2015/050351, International Filing Date—Mar. 24, 2015 consisting of 13-pages.

*Primary Examiner* — Andrew Lai
*Assistant Examiner* — Andrew C Lee
(74) *Attorney, Agent, or Firm* — Christopher & Weisberg, P.A.

(57) ABSTRACT

A wireless device and a method for a wireless device served by a first network node on a primary cell (PCell) is provided. The wireless device is capable of using at least two secondary serving cells (SCells). A first request to perform a measurement on at least one cell on a first secondary component carrier (SCC) with a deactivated first SCell using at least a first measurement cycle is received. A second request to perform a measurement on at least one cell on a second SCC with a deactivated second SCell using at least a second measurement cycle is received. An effective serving cell interruption probability (Peff) of missed at least one of Acknowledgement and Negative-Acknowledgement signaling in an uplink direction is determined based on at least the first measurement cycle and the second measurement (Continued)

cycle. A serving cell interruption probability is ensured to not exceed the determined Peff.

41 Claims, 7 Drawing Sheets

(56) References Cited

U.S. PATENT DOCUMENTS

| | | | | |
|---|---|---|---|---|
| 2013/0322279 A1* | 12/2013 | Chincholi | ............. | H04W 24/10 370/252 |
| 2015/0230112 A1* | 8/2015 | Siomina | ................ | G01S 5/0205 370/252 |
| 2016/0050534 A1* | 2/2016 | Lim | ...................... | G01S 5/0236 370/252 |

* cited by examiner

METHODS FOR MANAGING INTERRUPTIONS WITH MULTIPLE DEACTIVATED SCELLS

TECHNICAL FIELD

The present invention relates to carrier aggregation operation of wireless devices, and in particular to managing serving cell performance when performing measurements on at least one secondary component carrier (SCC).

BACKGROUND

The growing increase in wireless communication connectivity and usage has continued to put pressure on service providers to expand coverage areas and increase data rates. In Long Term Evolution (LTE) Advanced, one way to increase data rates is to implement a multicarrier or carrier aggregation (CA) scheme. In CA operation, the wireless device is able to receive and/or transmit data to more than one serving cell, thereby increasing overall transmission/reception bandwidth. In other words, a CA capable wireless device may be configured to operate with more than one serving cells. The carrier of each serving cell is generally called as a component carrier (CC). The component carrier (CC) means an individual carrier in a multi-carrier system.

The term carrier aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the component carriers (CCs) in Carrier Aggregation (CA) is the primary component carrier (PCC), also referred to as a primary carrier or anchor carrier. The remaining CCs are called secondary component carriers (SCCs), also referred to as secondary carriers or supplementary carriers. The serving cell, as used herein, is interchangeably called a primary cell (PCell) or primary serving cell (PSC). Similarly the secondary serving cell, as used herein, is interchangeably called as secondary cell (SCell) or secondary serving cell (SSC).

Generally, the primary CC, i.e., PCC or PCell, carries the essential wireless device specific signaling. The primary CC exists in both uplink and downlink directions in CA. Where there is a single Uplink (UL) CC, the PCell is on that CC. Further, the network may assign different primary carriers to different wireless devices operating in the same sector or cell. Measurements are performed by the wireless device on the serving one or more cells (multiple serving cells may be with CA) as well as on neighbor cells over some known reference symbols or pilot sequences. These measurements are done on cells on an intra-frequency carrier, inter-frequency carrier(s) as well as on inter-Radio Access Technology (RAT) carriers(s), depending upon whether the wireless device supports that RAT.

In a CA scenario, the wireless device may perform the measurements on the cells on the primary component carrier (PCC) as well as on the cells on one or more secondary component carriers (SCCs). A CA capable wireless device may also perform inter-frequency measurements without measurement gaps since the wireless device is configured with a broadband receiver and/or multiple receivers. Examples of intra-frequency and inter-frequency measurements in LTE are Reference symbol received power (RSRP) and Reference symbol received quality (RSRQ). Examples of intra-frequency and inter-frequency measurements in High speed packet access (HSPA) are Common pilot channel received signal code power (CPICH RSCP) and CPICH Ec/No.

Measurements such as mobility measurements may also include identifying or detecting a cell in which cell detection includes identifying at least the physical cell identity (PCI), primary scrambling code (PSC) or base station identity code (BSIC), and performing the signal measurement, e.g., RSRP, RSCP or RSSI, of the identified cell. The wireless device may also have to acquire the cell global ID (CGI) of a cell.

Examples of positioning measurements in LTE are reference signal time difference (RSTD) for OTDOA positioning method, and wireless device RX-TX time difference measurement for E-CID positioning method. The wireless device RX-TX time difference measurement requires the wireless device to perform measurement on downlink reference signal as well as on uplink transmitted signals. Another example of positioning measurements is UL Relative Time Of Arrival (RTOA), which is performed in UL on radio signals (namely SRS) transmitted by the wireless device.

The radio measurements performed by the wireless device are used by the wireless device for one or more radio operational tasks. Examples of such tasks are reporting the measurements to the network, which in turn may use the measurements for various tasks. For example, in the RRC_CONNECTED state the wireless device reports radio measurements to the serving node or to another network node via the serving node. In response to the reported wireless device measurements, the network node such as the serving node makes certain decisions, e.g., it may send mobility command to the wireless device for the purpose of cell change, request more measurements, (re)configure the set of serving cell, (re)configure one or more network node parameters related to radio signal transmission and/or reception configuration, calculate a performance metric or performance statistical measure, etc. In another example the wireless device may itself use the radio measurements for performing tasks, e.g., cell reselection, etc.

Several positioning methods for determining the location of a target device such as a wireless device, mobile relay, PDA, etc., exist. Several of these well-known methods include: Satellite based methods that use A-GNSS (e.g. A-GPS) measurements; OTDOA methods that uses wireless device RSTD measurement; UTDOA, which uses measurements done at LMU; Enhanced cell ID that uses one or more of wireless device Rx-Tx time difference, BS Rx-Tx time difference, LTE P/RSRQ, HSPA CPICH measurements, angle of arrival (AoA) etc.; and hybrid methods that use measurements from more than one of these known methods. In LTE, the positioning node configures the wireless device, eNodeB or LMU to perform one or more positioning measurements. The positioning measurements are used by the wireless device or positioning node to determine the wireless device location. Once such positioning method known in the art is OTDOA that makes use of the measured timing of downlink signals received from multiple eNode Bs at the wireless device.

A multi-carrier SCell setup herein refers to a procedure which enables the network node to at least temporarily setup or release the use of a SCell, in DL and/or UL by the CA capable wireless device. The SCell setup or release procedure or command can perform any one or more of: configuration of SCell(s), de-configuration of SCell(s), activation of SCell(s), and deactivation of SCell(s). The configuration procedure (i.e. addition/release of SCell is used by the serving radio network node, e.g., eNode B, to configure a CA capable wireless device with one or more SCells. On the other hand, the de-configuration procedure is used by the eNode B to de-configure or remove one or more already configured SCells (DL SCell, UL SCell or both). The configuration or de-configuration procedure can also be used to change the current multi-carrier configuration e.g. for increasing or decreasing the number of SCells or for swapping the existing SCell(s) with new one(s). Further, the serving radio network node can activate one or more deactivated SCells or deactivate one or more SCells on the corresponding configured secondary carriers. The PCell is always activated. The configured SCells are initially deactivated upon addition and after a cell change, e.g., handover. The deactivation of SCell saves wireless device battery power.

The wireless device may perform measurements even on a deactivated SCell or other cells on the SCC with a deactivated SCell. In this case, the measurements are performed in measurement cycles configured by protocol(s) for higher network layers. It is expected that the measurements of deactivated SCells or other cells on the SCC with a deactivated SCell are made without network provided measurement gaps. The PRS configuration for an RSTD and the SCell measurement cycle used for mobility measurements, e.g., RSRP and RSRQ, are examples of measurement cycles. The SCell measurement cycles may have periodicity of 160 ms, 320 ms, 640 ms or 1024 ms. The maximum time of a measurement within each measurement cycle is currently not restricted by Third Generation Partnership Project (3GPP) standard, but in practice is likely to be up to 6 subframes in each cycle.

However, SCell setup or release, i.e., when SCell is configured, de-configured, activated or deactivated, may cause a glitch or interruption of operation on the PCell or any other activated SCell. Similarly, a glitch or interruption of operation of the PCell or any other activated SCell may occur when the radio for receiving the deactivated SCell is enabled or disabled to make measurements of cells on the deactivated SCC. The term "operation" as used herein means reception and/or transmission of signals. The glitch in UL and/or DL typically occurs when the wireless device has a single radio chain to receive and/or transmit more than one CC. In some situations, the glitch may even occur when the wireless device has independent radio chains on the same chip.

The glitch may occur when the carrier aggregation (CA) capable wireless device changes its reception and/or transmission bandwidth (BW) from single-carrier to multiple-carrier operation or vice versa. In order to change the BW, the wireless device has to reconfigure its RF components in the RF chain, e.g., RF filter, power amplifier (PA), etc. For example, the interruption may be caused due to several factors including RF tuning to reconfigure BW, i.e., shorten or extend, setting or adjusting of radio parameter such as an AGC setting, etc. This interruption caused by the reconfiguration of RF components can vary between 2-5 ms. The glitch may also occur even for interband CA, where separate RF receiver paths are typically used to receive signals on each of the component carriers. In this case, glitches may occur when a single radio frequency (RF) integrated circuit (IC) is used to implement the receive paths. Transient effects may be caused by starting or stopping a local oscillator (LO) circuit which impacts another local oscillator circuit that is active.

During the interruption period the wireless device cannot transmit and/or receive any signal or information to/from the network. Further, during the interruption, the wireless device cannot perform measurements due the wireless device's inability to transmit and/or receive signals to/from the network. This interruption period leads to the loss or dropping of packets transmitted between the wireless device and the wireless device's serving cell(s). It should be noted that the interruption may impact several or all active carriers, and may affect both the uplink and downlink.

When performing measurement on cells of the SCC with deactivated SCell(s) without gaps the wireless device typically retunes the bandwidth of the wireless device receiver or activates another RF path. The cells may be an SCell and/or one or more neighbor cells of the SCC. Therefore, the interruption in DL and/or UL of serving cell occurs before and after each measurement sample, i.e., when the bandwidth is extended, e.g., from 20 MHz to 40 MHz, and also when it is reverted back to the BW of the serving carriers, e.g., from 40 MHz to 20 MHz. The interruption may also occur when the serving carrier and SCC are on the same chip. The interruption in each direction in this case can be between 2-5 ms, since the wireless device has to retune the center frequency and bandwidth of the downlink. The wireless device performs measurements on cells of SCC with deactivated SCell(s) on a regular basis according to the Scell measurement cycle configured by the eNB.

In an existing solution to managing these interruptions, the interruption on the PCell of up to five subframes is allowed for intra-band CA when any of the SCell setup or release procedures are executed by the wireless device. However, the interruption on the PCell of up to one subframe is allowed for inter-band CA when any of the SCell setup or release procedures are executed by the wireless device. Further, in existing solutions to managing these interruptions, the SCell activation and deactivation delay requirements are defined for the wireless device which supports only one SCell in at least the DL. Therefore, when the wireless device is configured with the SCell activates or deactivates, the SCell is not affected by any other serving cell, and the activating or deactivating does not affect any other SCell since there is only one SCell.

However, for a wireless device capable of being configured with two or more SCells, at least two SCells can also be deactivated and configured with SCell measurement cycles for doing measurements on SCCs with deactivated SCells. In this configuration, the wireless device behavior with respect to the impact on the serving cell performance, e.g., PCell interruption, is undefined in the 3GPP standards. This undefined wireless device behavior may result in the wireless device being unable to be served by the serving cell and/or may degrade the measurement performance of measurements on SCCs. In method for avoiding such a situation requires that all SCells be kept in an activated state, even though all of them are not needed all the time. However, this method is not efficient as keeping all SCells in an activated state will degrade wireless device battery life and may also require more processing resources in the network node.

SUMMARY

The present disclosure advantageously provides a method, wireless device, network node and system for managing interruptions with multiple deactivated secondary cells (SCells). In particular, the present disclosure advantageously specifies wireless device behavior with respect to serving cell performance when the wireless device is performing measurements on SCCs with deactivated SCells. Another advantage of the disclosure is that the procedures or processes described herein ensure that at least a certain minimum serving cell, e.g., PCell or another activated SCell, performance is met by the wireless device when the wireless device is configured with at least two SCCs with deactivated SCells. Further, the procedures described in the disclosure enable the network node to be aware of wireless device performance in terms of loss in serving cell performance when the wireless device measures on cells of at least two SCCs with deactivated SCells. Another advantage of the disclosure is the procedures or processes described herein enable the network node to decide whether to configure the wireless device with a certain type of measurement cycle, e.g., PRS measurement configuration, SCell measurement cycle, etc., or not, and also allows the network node to configure the periodicity of the measurement cycle for measuring cells on SCCs.

In one embodiment of the disclosure, a method for a wireless device served by a first network node on a primary cell, PCell, is provided. The wireless device is capable of using at least two secondary serving cells, SCells. A first request to perform a measurement on at least one cell on a first secondary component carrier, SCC, with a deactivated first SCell using at least a first measurement cycle is received. A second request to perform a measurement on at least one cell on a second SCC with a deactivated second SCell using at least a second measurement cycle is received. An effective serving cell interruption probability, Peff, of missed at least one of Acknowledgement, ACK, and Negative-Acknowledgement, NACK, signaling in an uplink, UL, direction is determined based on at least the first measurement cycle and the second measurement cycle. When transmitting packets between a serving cell and the wireless device, a serving cell interruption probability of a missed at least one of ACK and NACK signaling in the UL direction is ensured to not exceed the determined effective serving cell interruption probability, Peff, of a missed at least one of ACK and NACK signaling in the UL direction while performing the measurements on the cells of the first SCC and the second SCC.

According to one embodiment of this aspect, the ensuring that the serving cell interruption probability of missed at least one of ACK and NACK signaling in the UL direction does not exceed the determined effective serving cell interruption probability, Peff, of missed at least one of ACK and NACK signaling includes adapting at least one radio procedure to be performed by the wireless device. According to one embodiment of this aspect, the adapting of at least one radio procedure includes modifying a measurement sampling of measurements performed on the cells by performing the measurements using first and second measurement cycles during a same time period. According to another embodiment of this aspect, the adapting of at least one radio procedure includes modifying a measurement sampling of measurements performed on the cells by performing the measurements according to only an effective measurement cycle, Ceff. The Ceff is based on the first measurement cycle and the second measurement cycle.

According to another embodiment of this aspect, the adapting of at least one radio procedure includes modifying a measurement sampling of measurements performed on the cells by performing the measurements according to an effective measurement cycle, Ceff. The effective measurement cycle, Ceff, is one of a minimum and maximum periodicity of the first measurement cycle and the second measurement cycle. According to another embodiment of the disclosure, the measurements according to the effective measurement cycle, Ceff, are performed such that measurements on the first SCC are performed one of just before, simultaneously with and just after measurements on the second SCC.

According to another embodiment of this aspect, the adapting of at least one radio procedure includes at least one of modifying measurement reporting, modifying UL transmission configuration in time and dropping at least one UL transmission. According to another embodiment of this aspect, the determining of the serving cell interruption probability, Peff, includes determining an effective measurement cycle periodicity, Ceff, the Ceff being based on the first measurement cycle and the second measurement cycle. The serving cell interruption probability, Peff, is determined based on the effective measurement cycle periodicity, Ceff. According to another embodiment of this aspect, the effective measurement cycle periodicity, Ceff, is based on at least one of a minimum function and maximum function applied to a periodicity of the first measurement cycle and a periodicity of the second measurement cycle.

According to another embodiment of this aspect, the determining the serving cell interruption probability, Peff, includes determining an effective measurement cycle periodicity, Ceff, and mapping the effective measurement cycle periodicity, Ceff, to the effective cell interruption probability, Peff. The Ceff is based on the first measurement cycle and the second measurement cycle. According to another embodiment of this aspect, the first measurement cycle is used by the wireless device for performing one of mobility measurements and positioning measurements on the first SCC, and the second measurement cycle is used by the wireless device for performing one of mobility measurements and positioning measurements.

According to another embodiment of this aspect, the serving cell is one of the PCell and at least one activated SCell. According to another embodiment of this aspect, the wireless device is served by only the PCell and is one of configured and reconfigured with only the first SCC. A second effective serving cell interruption probability, Peff2, of missed at least one of Acknowledgement, ACK, and Negative-Acknowledgement, NACK, signaling in an uplink, UL, direction is determined based on the first measurement cycle. When transmitting packets between a serving cell and the wireless device, a serving cell interruption probability of a missed at least one of ACK and NACK signaling in the UL direction is ensured to not exceed the determined second effective serving cell interruption probability, Peff2, of a missed at least one of ACK and NACK signaling in the UL direction while performing the measurements on the cells of the first SCC. According to another embodiment of this aspect, the first measurement cycle and the second measurement cycles are any of: a first SCell measurement cycle and a second SCell measurement cycle used by the wireless device for performing mobility measurements; and a first Positioning Reference Signal, PRS, configuration periodicity and a second PRS configuration periodicity used by the wireless device for performing positioning measurements.

According to another embodiment of the disclosure, a wireless device served by a first network node on a primary cell, PCell, is provided. The wireless device is capable of using at least two secondary serving cells, SCells. The wireless device includes a receiver configured to receive a first request to perform a measurement on at least one cell on a first secondary component carrier, SCC, with a deactivated first SCell using at least a first measurement cycle. The receiver is further configured to receive a second request to perform a measurement on at least one cell on a second SCC with a deactivated second SCell using at least a second measurement cycle. The wireless device further includes a processor. The wireless device further includes a memory configured to store computer instructions that, when executed by the processor, cause the processor to determine an effective serving cell interruption probability, Peff, of missed at least one of Acknowledgement, ACK, and Negative-Acknowledgement, NACK, signaling in an uplink, UL, direction based on at least the first measurement cycle and the second measurement cycle. The processor is further caused to ensure that when transmitting packets between a serving cell and the wireless device, a serving cell interruption probability of missed at least one of ACK and NACK signaling in the UL direction does not exceed the determined effective serving cell interruption probability, Peff, of missed at least one of ACK and NACK signaling in the UL direction while performing the measurements on the cells of the first SCC and the second SCC.

According to another embodiment of this aspect, a memory is configured to store measurement cycle durations and the effective serving cell interruption probability. According to another embodiment of this aspect, the ensuring that the serving cell interruption probability of missed at least one of ACK and NACK signaling in the UL direction does not exceed the determined effective serving cell interruption probability, Peff, of missed at least one of ACK and NACK signaling includes adapting at least one radio procedure performed by the wireless device. According to another embodiment of this aspect, the adapting of at least one radio procedure includes modifying a measurement sampling of measurements performed on the cells by performing the measurements using first and second measurement cycles during a same time period.

According to another embodiment of this aspect, the adapting of at least one radio procedure includes modifying a measurement sampling of measurements performed on the cells by performing the measurements according to only an effective measurement cycle, Ceff. The Ceff is based on the first measurement cycle and the second measurement cycle. According to another embodiment of this aspect, the adapting of at least one radio procedure includes modifying a measurement sampling of measurements performed on the cells by performing the measurements according to an effective measurement cycle, Ceff. The effective measurement cycle, Ceff, is one of a minimum and maximum periodicity of the first measurement cycle and the second measurement cycle. According to another embodiment of this aspect, the measurements according to the effective measurement cycle, Ceff, are performed such that measurements on the first SCC are performed one of just before, simultaneously with and just after measurements on the second SCC.

According to another embodiment of this aspect, the adapting of at least one radio procedure includes at least one of modifying measurement reporting, modifying UL transmission configuration in time and dropping at least one UL transmission. According to another embodiment of this aspect, the determining of the serving cell interruption probability, Peff, includes determining an effective measurement cycle periodicity, Ceff. The Ceff is based on the first measurement cycle and the second measurement cycle. The serving cell interruption probability, Peff, is determined based on the effective measurement cycle periodicity, Ceff.

According to another embodiment of this aspect, the effective measurement cycle periodicity, Ceff, is based on at least one of a minimum function and maximum function applied to a periodicity of the first measurement cycle and a periodicity of the second measurement cycle. According to another embodiment of this aspect, The determining the serving cell interruption probability, Peff, includes determining an effective measurement cycle periodicity, Ceff. The Ceff is based on the first measurement cycle and the second measurement cycle. The determining further includes mapping the effective measurement cycle periodicity, Ceff, to the effective cell interruption probability, Peff.

According to another embodiment of this aspect, the first measurement cycle is used by the wireless device for performing one of mobility measurements and positioning measurements on the first SCC, and the second measurement cycle performs one of mobility measurements and positioning measurements. According to another embodiment of this aspect, the serving cell is one of the PCell and at least one activated SCell.

According to another embodiment of the disclosure, a method in a network node is provided. A threshold of a serving cell interruption probability, Peff, of missed at least one of Acknowledgement, ACK, and Negative-Acknowledgement, NACK, signaling in an uplink direction allowed by a wireless device when measuring in cells of at least two secondary component carriers, SCCs, with deactivated secondary cells, SCells, using respective measurement cycles is determined. The serving cell interruption probability, Peff, of missed at least one of Acknowledgement, ACK, and Negative-Acknowledgement, NACK, signaling in the uplink channel is ensured to be below the threshold. The at least one measurement cycle being a period with which the wireless device performs measurements on at least one cell of at least two SCCs.

According to another embodiment of this aspect, the ensuring that the serving cell interruption probability, Peff, of missed at least one of Acknowledgement, ACK, and Negative-Acknowledgement, NACK, signaling in the uplink direction is below the threshold includes modifying at least one parameter associated with at least one measurement cycle. According to another embodiment of this aspect, the at least one parameter includes at least one of a periodicity of the measurement cycle and a time offset of the measurement cycle. According to another embodiment, an effective measurement cycle, Ceff, is determined based on the measurement cycles. A serving cell interruption probability, Peff, is determined based on the effective measurement cycle, Ceff. The modifying of the at least one measurement cycle is based on the determined serving cell interruption probability, Peff. According to another embodiment of this aspect, the effective measurement cycle periodicity, Ceff, is based on at least one of a minimum function and maximum function applied to the measurement cycles.

According to another embodiment of this aspect, the determining of the serving cell probability, Peff, includes mapping the effective measurement cycle periodicity, Ceff, to a predefined serving cell interruption probability, Peff. According to another embodiment of this aspect, the at least one measurement cycle is any of: a SCell measurement cycle used by the wireless device for performing mobility measurements, and a PRS configuration periodicity used by the wireless device for performing positioning measurements.

According to another embodiment of this disclosure, a network node is provided. The network node includes a processor and a memory. The memory is configured to store: measurement cycle durations, a serving cell interruption probability, Peff, a threshold, Pthresh, of the serving cell interruption probability, and computer instructions that, when executed by the processor, cause the processor to determine a threshold of a serving cell interruption probability, Peff, of missed at least one of Acknowledgement, ACK, and Negative-Acknowledgement, NACK, signaling in an uplink direction allowed by a wireless device when measuring in cells of at least two secondary component carriers, SCCs, with deactivated secondary cells, SCells, using respective measurement cycles. The computer instructions that, when executed by the processor, further cause the processor to ensure the serving cell interruption probability, Peff, of missed at least one of Acknowledgement, ACK, and Negative-Acknowledgement, NACK, signaling in the uplink channel is below the threshold. The at least one measurement cycle is a duration in which the wireless device performs measurements on at least one cell of at least two SCCs.

According to another embodiment of this aspect, the ensuring that the serving cell interruption probability, Peff, of missed at least one of Acknowledgement, ACK, and Negative-Acknowledgement, NACK, signaling in the uplink direction is below the threshold includes modifying at least one measurement cycle. According to another embodiment of this aspect, the memory is further configured to store additional computer instructions that, when executed by the processor, cause the processor to determine an effective measurement cycle, Ceff, based on the measurement cycles and determine a serving cell interruption probability, Peff, based on the effective measurement cycle, Ceff. The modifying of the at least one measurement cycle being based on the determined serving cell interruption probability, Peff. According to another embodiment of this aspect, the effective measurement cycle periodicity, Ceff, is based on at least one of a minimum function and maximum function applied to the measurement cycles. According to another embodiment of this aspect, the determining of the serving cell probability, Peff, includes mapping the effective measurement cycle periodicity, Ceff, to a predefined serving cell interruption probability, Peff.

According to another embodiment of the disclosure, a network node is provided. The network node includes a measurement configuration module configured to determine a threshold, Pthresh, of a serving cell interruption probability, Peff, of missed at least one of Acknowledgement, ACK, and Negative-Acknowledgement, NACK, signaling in an uplink signal allowed by a wireless device when measuring in cells of at least two secondary component carriers, SCC, with deactivated secondary cells, SCells, using respective measurement cycles. The measurement configuration module is further configured to adapt at least one measurement cycle based on at least one pre-defined rule, the at least one measurement cycle being a duration in which the wireless device performs measurements on at least one cell of at least two SCCs, such that a serving cell interruption probability of missed at least one of Acknowledgement, ACK, and Negative-Acknowledgement, NACK, signaling in the uplink signal caused by the wireless device remains below the determined threshold, Pthresh.

According to another embodiment of the disclosure, a wireless device is provided. The wireless device is served by a first network node on a primary cell, PCell. The wireless device is capable of using at least two secondary serving cells, SCells. The wireless device includes a receiver module configured to receive a first request to perform a measurement on at least one cell on a first secondary component carrier, SCC, with a deactivated first SCell using at least a first measurement cycle, and receive a second request to perform a measurement on at least one cell on a second SCC with a deactivated second SCell using at least a second measurement cycle. The wireless device includes an adapter module configured to determine an effective serving cell interruption probability, Peff, of missed at least one of Acknowledgement, ACK, and Negative-Acknowledgement, NACK, signaling in an uplink, UL, direction based on at least the first measurement cycle and the second measurement cycle, and ensure that when transmitting packets between a serving cell and the wireless device, a serving cell interruption probability of missed at least one of ACK and NACK signaling in the UL direction does not exceed the determined effective serving cell interruption probability, Peff, of missed at least one of ACK and NACK signaling in the UL direction while performing the measurements on the cells of the first SCC and the second SCC.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
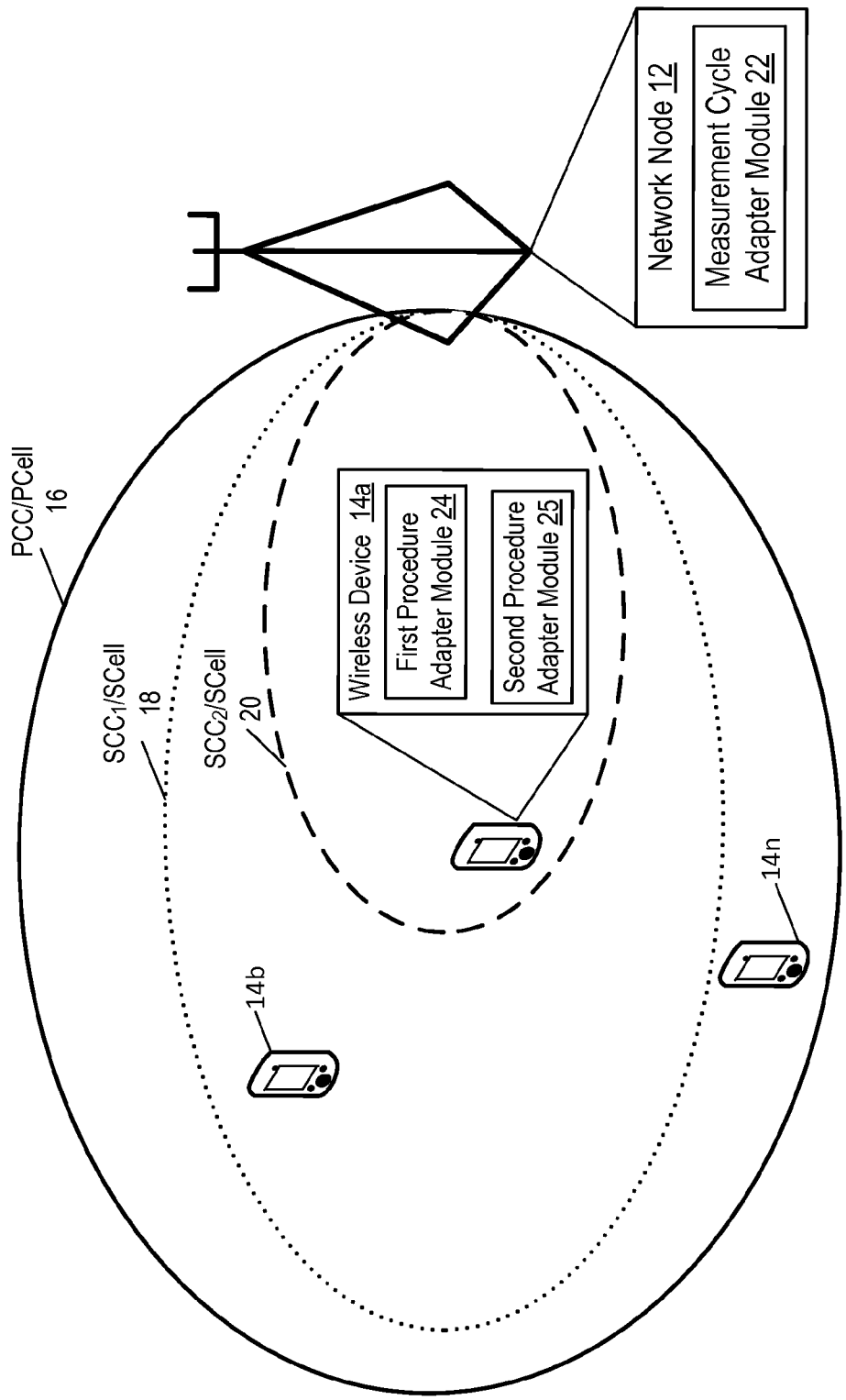
FIG. 1 is a block diagram of an exemplary system that manages serving cell performance in accordance with the principles of the disclosure.

The method, wireless device, network node and system described herein provide for carrier aggregation operation of wireless devices, and in particular to managing serving cell performance when performing measurements on at least one secondary component carrier (SCC). The present disclosure advantageously specifies wireless device behavior with respect to serving cell performance when the wireless device is performing measurements on SCCs with deactivated SCells. Another advantage of the disclosure is that the procedures or processes described herein ensure that at least a certain minimum serving cell, e.g., PCell or another activated SCell, performance is met by the wireless device when the wireless device is configured with at least two SCCs with deactivated SCells. Further, the predefined procedures described in the disclosure enable the network node to be aware of wireless device performance in terms of loss in serving cell performance when the wireless device measures on cells of at least two SCCs with deactivated SCells.

Another advantage of the disclosure is that the procedures or processes described herein enable the network node to decide whether to configure the wireless device with a certain type of measurement cycle, e.g., PRS measurement configuration, SCell measurement cycle, etc., or not, and also allows the network node to configure the periodicity of the measurement cycle for measuring cells on SCCs.

Accordingly, the wireless device, network node, and system components have been represented where appropriate by conventional symbols in the drawings, showing only those specific details that are pertinent to understanding the embodiments of the concepts described herein so as not to obscure the disclosure with details that will be readily apparent to those of ordinary skill in the art having the benefit of the description herein. In some embodiments, non-limiting term wireless device is used in which wireless device can be any type of wireless device capable of communicating with network node or another wireless device over radio signals. Further, wireless device may also be radio communication device, target device, device to device wireless device, user equipment (UE), machine type wireless device or wireless device capable of machine to machine communication, a sensor equipped with wireless device, iPAD, Tablet, mobile terminals, mobile telephone, laptop computer, appliance, automobile, smart phone, laptop embedded equipped (LEE), laptop mounted equipment (LME), USB dongles and Customer Premises Equipment (CPE), among other devices that can communicate radio or wireless signals as are known in the art.

Before describing in detail exemplary embodiments that are in accordance with the disclosure, it is noted that the embodiments reside primarily in combinations of wireless device and network node components and processing steps related to managing serving cell performance when performing measurements on at least one secondary component carrier (SCC). Accordingly, components have been represented where appropriate by conventional symbols in the drawings, shown only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for managing serving cell performance when performing measurements on at least one secondary component carrier (SCC) in accordance with the principles of the disclosure and designated generally as "10." System 10 includes one or more network nodes 12 and one or more wireless devices 14a-14n (referred to collectively as wireless device 14). In one or more embodiments, wireless device 14 is served by network node 12 with PCell 16 operating on a first carrier frequency f1 (PCC), and wireless device 14 is also capable of being served by at least two secondary serving cells, e.g., SCell 18 and SCell 20, operating on respective frequencies, e.g., f2 ($SCC_1$) and f3 ($SCC_2$). In some embodiments, wireless device 14 is also capable of being served by a third SCell operating on carrier frequency f4 ($SCC_3$). Wireless device 14 is also configured with at least a first measurement cycle for a first type of measurement (C11) for measuring cells on $SCC_1$, and wireless device 14 is also configured with at least a second measurement cycle for the first type of measurement (C21) for measuring cells on $SCC_2$. The term "served" or "being served" with respect to wireless device 14 means that wireless device 14 is configured with the corresponding cells, e.g., PCell and SCell(s), and can receive from and/or transmit data to network node 14 on the serving cell, e.g. on PCell or any of SCell. The data is transmitted or received via physical channels, e.g. PDSCH in DL, PUSCH in UL, etc.

In some embodiments, generic terminology such as "network node" or "radio network node" is used in which "network node" may refer to a base station, radio base station, base transceiver station, base station controller, network controller, evolved Node B (eNB), Node B, RNC, relay node, positioning node, E-SMLC, location server, repeater, access point, radio access point, Remote Radio Unit (RRU) Remote Radio Head (RRH), multi-standard radio (MSR) radio node such as MSR BS nodes in distributed antenna system (DAS), SON node, O&M, OSS, MDT node, Core network node and/or MME, among other network nodes known in the art.

In one or more embodiments of the disclosure, network node 12 provides Primary component carrier (PCC) 16 or PCell 16, secondary component carrier ($SCC_1$) 18 or SCell 18, and another secondary component carrier ($SCC_2$) 20 or SCell 20. As discussed in the background section of the disclosure, PCC 16 carries the essential wireless device specific signaling, and PCC 16 is always activated for wireless device 14. Network node 12 can activate one or more SCells, e.g., $SCC_1$ and/or $SCC_2$, for wireless device 14. Further, the coverage areas of PCC 16, $SCC_1$ 18 and $SCC_2$ 20 may vary, and the number of SCCs may vary. In one or more embodiments of the disclosure, network node 12 includes Measurement Cycle Adaptor Module 22 for ensuring serving cell performance when wireless device 14 performs at least one measurement on at least one SCC, as discussed in detail with respect to FIGS. 4 and 5.

Figure 2:
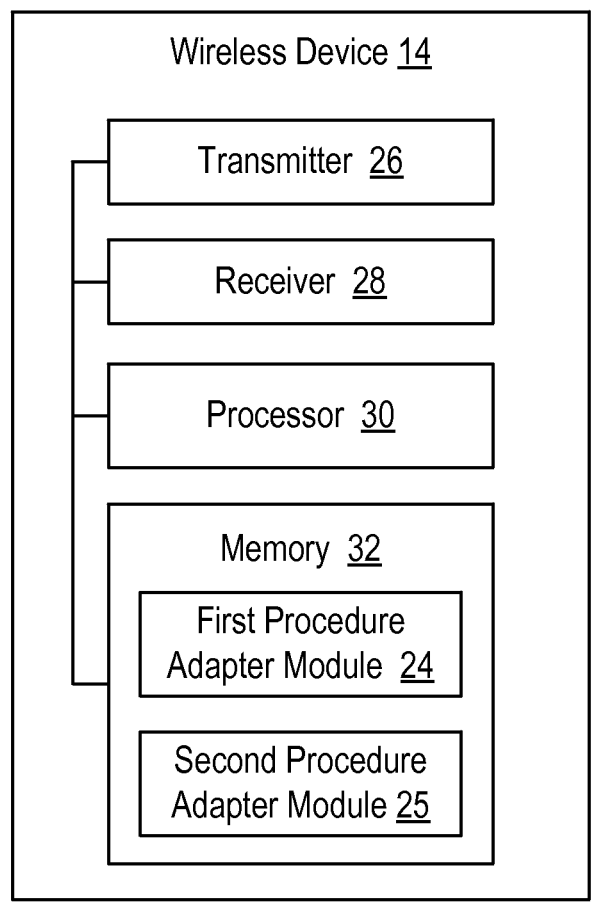
FIG. 2 is a block diagram of an exemplary wireless device in accordance with the principles of the disclosure.
Figure 3:
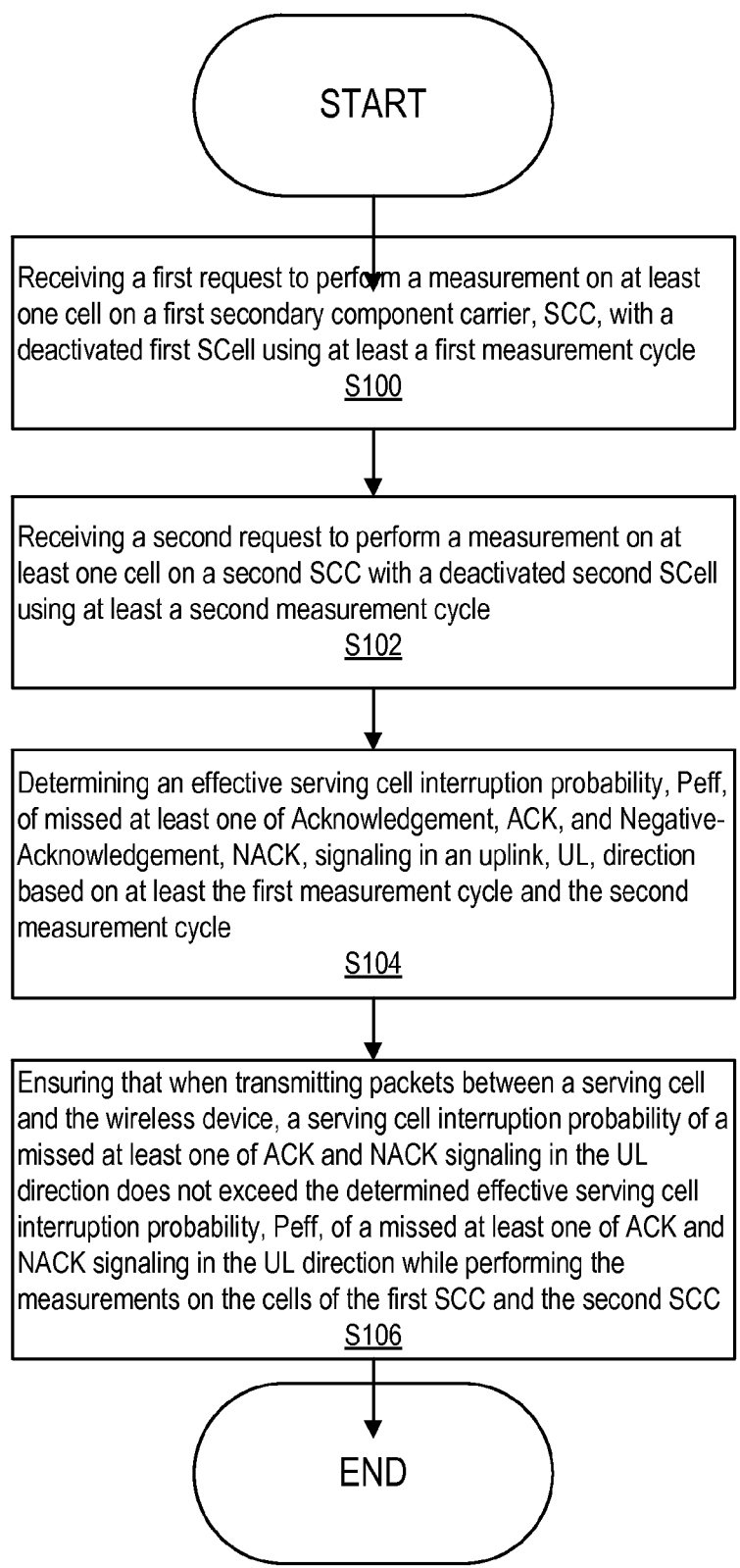
FIG. 3 is a signaling flow diagram of an exemplary process of first procedure adapter module for managing serving cell performance in accordance with the principles of the disclosure.

In one or more embodiments of the disclosure, wireless device 14 includes Procedure Adapter Module 24 for ensuring serving cell performance when wireless device 14 performs at least one measurement on at least one SCC, as discussed in detail with respect to FIGS. 2 and 3. Further, one or more embodiments of the disclosure are applicable to any RAT or multi-RAT systems, which involve measurement without gaps and/or multi-carrier operation, e.g., LTE FDD/TDD, WCDMA/HSPA, GSM/GERAN, Wi Fi, CDMA2000, etc. One or more embodiments of the disclosure are also applicable to procedures or radio operations performed by wireless device 14 in any RRC state, e.g., RRC connected state, CELL_DCH state, idle state, idle mode, CELL_PCH, URA_PCH, CELL_FACH, etc. Further, while only network node 12 is illustrated providing PCC 16, $SCC_1$ 18 and $SCC_2$ 20, one or more co-located or non-co-located nodes may provide one or more component carriers in one or more embodiments of the disclosure.

In system 10, the transmission of signals, transmission opportunities and/or measurement opportunities between wireless device 14 and serving cell(s) (at least the PCell 16) are interrupted during the time instances or bursts of periods when wireless device 14 performs one or more of the following radio operations on at least cells of $SCC_1$ 18:

One or more radio measurements on at least one cell on SCCs with deactivated SCell; and SCell setup or release operation on at least $SCC_1$, i.e., activation of SCell, deactivation of SCell, configuration of SCC or de-configuration of SCC.

Furthermore, the transmission of signals or transmission opportunities and/or measurement opportunities between wireless device 14 and SCell 18 is interrupted/lost during time instances or bursts of periods when wireless device 14 performs one or more of the above radio operations on cells of at least $SCC_2$ 20. For example if wireless device 14 measures on cells of $SCC_2$ 20 with deactivated SCell, then the transmission of signaled between the wireless device and the first SCell, i.e., $SCC_1$ 18 or SCell 18, is lost or interrupted.

In one or more embodiments, the interruptions at SCell addition or release for intra-band CA with two downlink SCells is allowed for up to five subframes on PCell and other activated SCell during an RRC reconfiguration procedure. This interruption is for both uplink and downlink of PCell and the other activated SCell. In one or more embodiments, interruptions at SCell addition or release for inter-band CA with two downlink SCells are allowed for up to one subframe on PCell and the other activated SCell during a RRC reconfiguration procedure. This interruption is for both uplink and downlink of PCell and the other activated SCell. In one or more embodiments, interruptions are allowed at SCell addition or release for combined intra-band and inter-band CA with two downlink SCells. For example, SCell is added or released, the wireless device is allowed interruption: on PCell for up to five subframes during the RRC reconfiguration procedure provided that PCell and SCell are in the same frequency band, or for up to one subframes during the RRC reconfiguration procedure if SCell and PCell are in different frequency bands; and on the other activated SCell for up to five subframes provided that both SCells are in the same frequency band or for up to one subframes provided that SCells are in different frequency bands. The interruption is for both uplink and downlink of PCell and other activated SCell.

In one or more embodiments, when an intra-band SCell is activated or deactivated, wireless device 14 is allowed an interruption of up to five subframes on PCell and the other activated SCell during the activation or deactivation delay. The interruption is for both uplink and downlink of PCell and the other activated SCell. In one or more embodiments, when the inter-band SCell is activated or deactivated, wireless device 14 that requires interruption is allowed an interruption of up to one subframe on PCell and the other activated SCell during the activation or deactivation delay. The interruption is for both uplink and downlink of PCell and the other activated SCell. In one or more embodiments, when a SCell is activated or deactivated, wireless device 14 is allowed an interruption: on PCell of up to five subframes provided that the SCell and the PCell are in the same frequency band or on PCell of up to one subframe provided that the SCell and the PCell are in different frequency bands, and on the other activated SCell for up to five subframes provided that both SCells are in the same frequency band or on PCell for up to one subframes provided that the two SCells are in different frequency bands. The interruption is for both uplink and downlink of PCell and the other activated SCell.

In one or more embodiments, if only one SCell is activated, then the interruption on the PCell and the activated SCell due to measurements on SCC with the deactivated SCell are allowed with up to 0.5% probability of missed at least one of ACK and NACK when the configured measCycleSCell is 640 ms or longer for the deactivated SCell. If both SCells are deactivated then the interruptions on the PCell due to measurements on the SCCs with the deactivated SCells are allowed up to 0.5% probability of missed at least one of ACK and NACK provided that the configured measCycleSCell is 640 ms or longer for at least one deactivated SCell. Each interruption shall not exceed five subframes.

In one or more embodiments, if only one SCell is activated, then the interruptions on the PCell and the activated SCell due to measurements on SCC with the deactivated SCell are allowed with up to 0.5% probability of missed at least one of ACK and NACK signaling when the configured measCycleSCell is 640 ms or longer for the deactivated SCell. If both SCells are deactivated then the interruptions on the PCell due to measurements on the SCCs with the deactivated SCells are allowed up to 0.5% probability of missed at least one of ACK and NACK signaling provided that the configured measCycleSCell is 640 ms or longer for at least one deactivated SCell. Each interruption shall not exceed one subframe.

In one or more embodiments, if one SCell is activated and the other SCell is deactivated, wireless device is allowed, due to measurements on the SCC with deactivated SCell, (1) an interruption on PCell with up to 0.5% probability of missed at least one of ACK and NACK signaling when the configured measCycleSCell for the deactivated SCell is 640 ms or longer; (2) an interruption on PCell with up to 0.5% probability of missed at least one of ACK and NACK signaling regardless of the configured measCycleSCell for the deactivated SCell if indicated by the network. Each interruption shall not exceed: one subframe if the PCell is not in the same band as the deactivated SCell, and five subframes if the PCell is in the same band as the deactivated SCell; (3) an interruption on the activated SCell with up to 0.5% probability of missed at least one of ACK and NACK when the configured measCycleSCell for the deactivated SCell is 640 ms or longer; and (4) an interruption on the activated SCell with up to 0.5% probability of missed at least one of ACK and NACK signaling regardless of the configured measCycleSCell for the deactivated SCell if indicated by the network. Each interruption shall not exceed: one subframes if the activated SCell is not in the same band as the deactivated SCell, and five subframes if the activated SCell is in the same band as the deactivated SCell.

In one or more embodiment, if both SCells are deactivated, wireless device is allowed, due to measurements on the SCCs with deactivated SCells, (1) an interruption on PCell with up to 0.5% probability of missed at least one of ACK and NACK signaling when any of the configured measCycleSCell for the two deactivated SCells is 640 ms or longer, (2) an interruption on PCell with up to 0.5% probability of missed at least one of ACK and NACK signaling regardless of the configured measCycleSCell for the two deactivated SCells if indicated by the network. Each interruption shall not exceed: one subframe if the PCell is not in the same band as any of the deactivated SCells and five subframes if the PCell is in the same band as any of the deactivated SCells.

If one SCell is activated and the other SCell is deactivated, then due to RSTD measurements on the SCC with deactivated SCell, the wireless device is allowed: (1) an interruption on PCell with up to 1.0% probability of missed at least one of ACK and NACK signaling when the PRS periodicity is 640 ms or longer. Each interruption shall not exceed: one subframe if the PCell is not in the same band as the deactivated SCell and five subframes if the PCell is in the same band as the deactivated SCell; and (2) an interruption on the activated SCell with up to 1.0% probability of missed at least one of ACK and NACK signaling when the PRS periodicity is 640 ms or longer. Each interruption shall not exceed: one subframe if the activated SCell is not in the same band as the deactivated SCell and five subframes if the activated SCell is in the same band as the deactivated SCell. If both SCells are deactivated, then due to RSTD measurements on one or both SCCs with deactivated SCells, the wireless device is allowed: (1) an interruption on PCell with up to 1.0% probability of missed at least one of ACK and NACK signaling when the configure PRS periodicity is 640 ms or longer in any of the SCCs. Each interruption shall not exceed: one subframe if the PCell is not in the same band as any of the deactivated SCells and five subframes if the PCell is in the same band as any of the deactivated SCells.

One or more embodiments described below involve three carriers, i.e., PCC 16, $SCC_1$ 18 and $SCC_2$ 20, as illustrated in FIG. 1, or may involve four carriers such as PCC, $SCC_1$ 18, $SCC_2$ 20 and $SCC_3$ (not shown). However, the one or more embodiments are also applicable to the scenario where wireless device 14 is configured to measure on any number of SCCs, e.g. $SCC_1$, $SCC_2$, ..., SCCn, with at least two of SCCs having been deactivated SCells. The one or more embodiments are also applicable to the scenario where wireless device 14 is configured to measure on a combination of non-serving carriers, e.g., inter-frequency and/or inter-RAT carriers, and SCC(s).

The interruption of signals between wireless device 14 and the serving cell, e.g. PCell 16 or SCell 18, 20, leads to loss or degradation of serving cell performance. The interruptions may affect PCell and/or one or more active SCells. The loss in serving cell performance can be expressed in terms of one or more metrics, which may be absolute or relative, such as error rate, loss of packets, packet loss rate, number of packets lost, packet drop rate, a reduction in the detection probability, an increase of misdetection probability, and probability of missed or dropped or lost packets. The performance measure used to measure and/or control the impact of interruption is referred to as interruption impact measure, which may be the actual measure or a target measure. A "packet" refers to any "block of data" such as a transport block sent over radio interface in UL or DL. The packet loss rate or number of lost packets is estimated over a certain period of time, e.g., measurement time of a radio measurement, pre-defined time, etc.

In one example, the number of lost packets is expressed as total number of missed at least one of Acknowledgement (ACK) and Negative-Acknowledgement (NACK) signaling in response to continuous transmission of data to wireless device 14 from its serving cell over certain time period. In LTE, the transmission opportunity or scheduling instance is one millisecond (ms), i.e., one Transmission Time Interval (TTI). Therefore, for example, the number of packets lost in LTE is 10 if wireless device 14 is unable to transmit ten at least one of ACK and NACK messages in the UL direction in response to continuous DL transmission over a period of 100 ms. In this example, the corresponding packet loss rate is 10% or 0.1. The corresponding packet loss rate may also be stated as the probability with which the fraction of at least one of ACK and NACK messages/signaling is transmitted in the uplink direction in response to continuous DL transmission over a period are missed, dropped or lost. The corresponding packet loss rate may be expressed as the ratio of:

the number of missed at least one of ACK and NACK messages/signaling in response to continuous transmission of data to wireless device 14 from its serving cell over certain time period (T0) to the total number of at least one of ACK and NACK messages/signaling in response to continuous transmission of data to wireless device 14 from its serving cell if all data blocks are received.

Therefore, the serving cell performance, e.g., PCell 16 or SCell 18 or 20 performance, may be expressed in terms of the probability of missed at least one of ACK and NACK messages/signaling. More specifically it can be expressed as the serving cell interruptions in terms of the probability of missed at least one of ACK and NACK signaling. For consistency herein, the term "serving cell interruption probability of missed at least one of ACK and NACK" is used to refer to the serving cell interruptions in terms of the probability of missed at least one of ACK and NACK signaling. Interruption on PCell 16 are referred to as "PCell interruption probability of missed at least one of ACK and NACK" signaling. Interruption on any SCell are referred to as "SCell interruption probability of missed at least one of ACK and NACK" signaling.

In one or more embodiments, at least two of the first, second, third and fourth network nodes are the same node or are co-located at the same site or location. For example, the wireless device may receive one or more messages for setting up or releasing one or more SCells from the first network node. In another example, the wireless device may receive one or more messages for setting up or releasing one or more SCells from the PCell. In one or more embodiments, any combination of the first, second, third and fourth network nodes are different nodes and may be located at different sites/location or may be logically different nodes that may still be co-located at the same site/location. In such embodiments, wireless device 14 may receive one or more messages for setting up or releasing one or more SCells from the respective SCells.

An exemplary block diagram of wireless device 14 is described with reference to FIG. 2. Wireless device 14 includes one or more transmitters 26 and one or more receivers 28 for communicating with network node 12 and other wireless devices 14, among other devices. In one embodiment, transmitter 26 and receiver 28 may be one or more transceivers. Wireless device 14 includes one or more processors 30 for performing wireless device functions and memory 32 in communication the processor in which memory 32 may store modules, programming instructions and data. In one or more embodiments, wireless device 14 stores first procedure adapter module 24. For example, Procedure Adapter Module 24 includes program instructions, which when executed by processor 30, cause processor 30 to perform the functions described in detail with respect to FIG. 3. wireless device 14 is configured to perform functions according to first procedure adapter module 24 when wireless device 14 is configured to use two or more SCCs with at least two deactivated SCells. This wireless device 14 configuration is referred to as an enhanced mode of operation or a second mode of operation. The first mode operation is discussed below with respect to second procedure adapter module 25. In one or more embodiments, wireless device 14 stores second procedure adapter module 25. For example, second procedure adapter module includes program instructions, which when executed by processor 30, cause processor 30 to perform the ensuring functions of second procedure adapter module 25 described in detail with respect to FIG. 4. The term "modules" as used herein may refer to software implementation, hardware implement or both hardware and software implementation.

An exemplary flow diagram for procedure adapter module 24 is illustrated in FIG. 3. The embodiment illustrated in FIG. 3 relates to wireless device 14 operating in the scenario where wireless device 14 is served by first network node 12 with PCell 16 operating on a first carrier frequency, and wireless device 14 is also configured to be capable of being served by at least two secondary SCells, i.e., SCell 16 operating on a second carrier frequency and SCell 18 operating on a third carrier frequency. Wireless device 14 configured with two or more SCCs with at least two deactivated SCells is referred to as enhanced mode of operation. wireless device 14 may also be configured to be capable of being served by a third SCell operating on a fifth carrier frequency. Further, the measurement cycle described with respect to FIG. 3 may be a CA measurement cycle or measurement configuration, e.g., RSTD measurement configuration received in the OTDOA assistance data by the wireless device from the positioning node.

Receiver 28 receives a first request to perform a measurement on at least one cell on a secondary component carrier (SCC) a deactivated first SCell using at least a first measurement cycle (Block S100). For example, wireless device 14 receives a first request from network node 12 to perform a measurement on at least one cell on secondary component carrier, e.g., SCC$_1$ 18, of a deactivated SCell using at least a first measurement cycle. Receiver 28 receives a second request to perform a measurement on at least one cell on a second SCC with a deactivated second SCell using at least a second measurement cycle (Block S102). For example, wireless device 14 receives a second request from network node 12 to perform a measurement on at least one cell on secondary component carrier, e.g., SCC$_2$ 20, of a deactivated SCell using at least a second measurement cycle.

Processor 30 of wireless device 14 is configured to determine an effective serving cell interruption probability (Peff) of missed at least one of Acknowledgement (ACK) and Negative-Acknowledgement (NACK) signaling in an uplink (UL) direction based on at least the first measurement cycle and the second measurement cycle (Block S104). In one or more embodiments, wireless device 14 uses at least one pre-defined rule or function to derive or determine an effective measurement cycle or measurement cycle periodicity ($C_{eff}$), which is a function of at least the first measurement cycle and the second measurement cycle with which wireless device 14 is configured by network node 12 to perform radio measurements on at least one cell of the SCC$_1$ 18 and at least one cell of the SCC$_2$ 20, respectively. Several general and specific examples of predefined rules or functions used by wireless device 14 for deriving the effective measurement cycle ($C_{eff}$) will now be discussed.

In one example of a general function for deriving $C_{eff}$ is given in Equation 1 when CA capable wireless device 14 is configured with M number of SCCs with their deactivated SCells.

$$C_{eff}=g\{g_1(C_{11},C_{12},\ldots,C_{1N}),g_2(C_{21},C_{22},\ldots,C_{2N}),\ldots,g_M(C_{M1},C_{M2},\ldots,C_{MN})\} \quad \text{(Equation 1)}$$

Where:
- $C_{1N}$ is the periodicity of measurement cycle of type N configured at wireless device 14 by network node 12 for performing radio measurements on one or more cells of SCC$_1$ 18 with deactivated SCell, i.e., when a first SCell is deactivated.
- $C_{2N}$ is the periodicity of measurement cycle of type N configured at wireless device 14 by network node 12 for doing radio measurements on one or more cells of SCC$_2$ with deactivated SCell, i.e., when a second SCell is deactivated.
- $C_{MN}$ is the periodicity of measurement cycle of type N configured at wireless device 14 by network node 12 for doing radio measurements on one or more cells of SCC$_M$ with deactivated SCell, i.e., when a M$^{th}$ SCell is deactivated.
- Functions g{ ... }, g1( ... ), g2( ... ) and gM( ... ) can be realized by any suitable operation know in the art. Examples of such operations include: maximum, minimum, xth percentile, mean, a linear combination of g1( ... ), g2( ... ) and gM( ... ), a non-linear combination of g1( ... ), g2( ... ) and gM( ... ), etc.

The measurement cycle may be of different types such as: an SCell measurement cycle, e.g., periodicity=640 ms, used for mobility measurements, e.g., RSRP, RSRQ etc., and a PRS configuration, e.g., PRS periodicity=1024 ms, used for positioning measurements, e.g., RSTD. Wireless device 14 can acquire the OTDOA PRS configuration for performing RSTD measurements from network node 12 that may be a positioning node or serving network node of wireless device 14 such as an eNode B. The OTDOA PRS configuration may also be referred to as RSTD configuration.

Other examples of general functions for deriving $C_{eff}$ are illustrated below in Equations 2 to Equation 4 where a CA capable wireless device is configured with M number of SCCs with their deactivated SCells.

$$C_{eff}=\text{Max}\{\min(C_{11},C_{12},\ldots,C_{1N}),\min(C_{21},C_{22},\ldots,C_{2N}),\ldots,\min(C_{M1},C_{M2},\ldots,C_{MN})\} \quad \text{(Equation 2)}$$

$$C_{eff}=\text{Max}\{\max(C_{11},C_{12},\ldots,C_{1N}),\max(C_{21},C_{22},\ldots,C_{2N}),\ldots,\max(C_{M1},C_{M2},\ldots,C_{MN})\} \quad \text{(Equation 3)}$$

$$C_{eff}=\text{Min}\{\min(C_{11},C_{12},\ldots,C_{1N}),\min(C_{21},C_{22},\ldots,C_{2N}),\ldots,\min(C_{M1},C_{M2},\ldots,C_{MN})\} \quad \text{(Equation 4)}$$

In one or more embodiments, the effective measurement cycle periodicity, Ceff, is based on at least one of a minimum function and maximum function applied to a periodicity of the first measurement cycle and a periodicity of the second measurement cycle. The various predefined rules or functions listed above provide various advantages. For example, the rule based on the minimum function (Min{ }) ensures that the packet loss rate is minimized in which assuming or changing to a shorter measurement cycle corresponds to lower packet loss; therefore, leading to better system performance. In another example, the rule based on the maximum function (Max{ }) ensures that wireless device 14 power consumption is minimized in which assuming or changing to a longer measurement cycle corresponds to a larger packet loss rate and allows wireless device 14 to change its receiver bandwidth more frequently. In one or more embodiments, wireless device 14 can use shorter bandwidth when not doing measurement on SCC with deactivated SCells, thus save battery power and lead to lower wireless device 14 battery consumption.

Examples of specific functions for deriving $C_{eff}$ are discussed below in which the specific functions correspond one or more specific configurations of system 10. In one example, a specific function for deriving $C_{eff}$ is illustrated in Equation 5 where a CA capable wireless device 14 is configured with $SCC_1$ 18 and $SCC_2$ 20 with their deactivated SCells and only subset of measurement cycle types.

$$C_{eff}=\max\{\max(C_{11},C_{12}),\max(C_{21},C_{22})\} \quad \text{(Equation 5)}$$

Where:
- $C_{11}$ is the periodicity of an SCell measurement cycle configured at wireless device 14 by network node 12, e.g., serving eNode B, for performing mobility measurements, e.g., RSRP/RSRQ, on one or more cells of $SCC_1$ 18 with deactivated SCell, i.e., when a first SCell is deactivated;
- $C_{12}$ is the periodicity of PRS occasion when PRS configured at wireless device 14 by network node 12, e.g. positioning node, for performing positioning measurements, e.g., RSTD, on one or more cells of $SCC_1$ 18 with deactivated SCell, i.e., when a first SCell is deactivated;
- $C_{21}$ is the periodicity of SCell measurement cycle configured at wireless device 14 by network node 12, e.g., serving eNode B, for performing mobility measurements, e.g., RSRP/RSRQ, on one or more cells of $SCC_2$ with deactivated SCell, i.e., when a second SCell is deactivated;
- $C_{22}$ is the periodicity of PRS occasion when PRS is configured at wireless device 14 by network node 12, e.g., positioning node, for performing positioning measurements, e.g., RSTD, on one or more cells of $SCC_2$ with deactivated SCell, i.e., when a second SCell is deactivated.

In one embodiment, where $C_{11}$ and $C_{12}$ are each 640 ms each, and $C_{21}$ and $C_{22}$ are 320 ms each, applying Equation 5, i.e., a predefined rule, leads to an effective measurement cycle of 640 ms.

In another example of a specific function for deriving $C_{eff}$ is discussed below with respect to Equation 6 where a CA capable wireless device 14 is configured with $SCC_1$ 18 and $SCC_2$ 20 with their deactivated SCells and only one type of measurement cycle type. wireless device 14 is only configured for mobility measurements on $SCC_1$ and $SCC_2$.

$$C_{eff}=\max\{C_{11},C_{21}\} \quad \text{(Equation 6)}$$

Where:
- $C_{11}$ is the periodicity of SCell measurement cycle configured at wireless device 14 by network node 12, e.g. serving eNode B, for performing mobility measurements, e.g. RSRP/RSRQ, on one or more cells of $SCC_1$ with deactivated SCell, i.e., when a first SCell is deactivated;
- $C_{21}$ is the periodicity of SCell measurement cycle configured at wireless device 14 by network node 12, e.g., serving eNode B, for performing mobility measurements, e.g. RSRP/RSRQ, on one or more cells of $SCC_2$ with deactivated SCell, i.e., when a second SCell is deactivated.

In another example of a specific function for deriving $C_{eff}$ is discussed below with respect to Equation 7 where a CA capable wireless device 14 is configured with $SCC_1$ and $SCC_2$ with their deactivated SCells and configured only one type of measurement cycle type on $SCC_1$ and another type of measurement cycle type on $SCC_2$.

$$C_{eff}=\max\{C_{11},C_{22}\} \quad \text{(Equation 7)}$$

Where:
- $C_{11}$ is the periodicity of SCell measurement cycle configured at wireless device 14 by network node 12, e.g., serving eNode B, for doing mobility measurements, e.g., RSRP/RSRQ, on one or more cells of $SCC_1$ with deactivated SCell, i.e., when a first SCell is deactivated;
- $C_{22}$ is the periodicity of PRS occasion when PRS is configured at wireless device 14 by network node 12, e.g. positioning node, for performing positioning measurements, e.g. RSTD, on one or more cells of $SCC_2$ with deactivated SCell, i.e., when a second SCell is deactivated.

After determining $C_{eff}$, processor 30 determines the effective serving cell interruption probability ($P_{eff}$) based on the $C_{eff}$. For example, one or more predefined rules may be used by processor 30 to map the determined $C_{eff}$ to an interruption impact measure, e.g., $P_{eff}$, for the serving cell, e.g., PCell and SCell(s), such that wireless device 14 can determine $P_{eff}$ for each of the serving cell(s) where interruption will occur due to measurements on SCCs.

Several general examples of the mapping of Ceff to Peff that is performed by processor 30 of wireless device 14 are discussed below with respect to Tables 1-3. In particular, one or more predefined rules are applied to the determine Ceff and at least one predefined threshold (H, H1, H2, etc.) to determine a $P_{eff}$ based on which rule is satisfied. The at least one predefined threshold may correspond to a predefined value from one or more telecommunication standards.

TABLE 1

Determination of $P_{eff}$ from $C_{eff}$ by wireless device 14 based on predefined 2-level mapping

| | Determination of $P_{eff}$ by wireless device | |
|---|---|---|
| Measurement cycle ID | Result of comparing $C_{eff}$ with threshold (H) | Determined $P_{eff}$ |
| 0 | $C_{eff} \leq H$ | $P_1$ |
| 1 | $C_{eff} > H$ | $P_2$ |

TABLE 2

Determination of $P_{eff}$ from $C_{eff}$ by wireless device 14 based on pre-defined 3-level mapping

| | Determination of $P_{eff}$ by wireless device | |
|---|---|---|
| Measurement cycle ID | Result of comparing $C_{eff}$ with thresholds (H1 and H2) | Determined $P_{eff}$ |
| 0 | $C_{eff} \leq H1$ | $P_1$ |
| 1 | $H1 < C_{eff} \leq H2$ | $P_2$ |
| 2 | $C_{eff} > H2$ | $P_3$ |

TABLE 3

Determination of Peff from Ceff by wireless device 14 based on pre-defined K-level mapping

| | Determination of $P_{eff}$ by wireless device | |
|---|---|---|
| Measurement cycle ID | Result of comparing $C_{eff}$ with thresholds (H1 and H2) | Determined $P_{eff}$ |
| 0 | $C_{eff} \leq H1$ | $P_1$ |
| 1 | $H1 < C_{eff} \leq H2$ | $P_2$ |
| ... | ... | ... |
| k − 1 | $C_{eff} > H_{k-1}$ | $P_K$ |

Several specific examples of the mapping performed by processor 30 of wireless device 14 are discussed below with respect to Tables 4-6.

TABLE 4

Determination of $P_{eff}$ from $C_{eff}$ by wireless device 14 based on pre-defined 2-level mapping

| | Determination of $P_{eff}$ by wireless device | |
|---|---|---|
| Measurement cycle ID | Result of comparing $C_{eff}$ with threshold (H) | Determined $P_{eff}$ |
| 0 | $C_{eff} \leq 320$ ms | 0 |
| 1 | $C_{eff} > 320$ | 0.5% |

TABLE 5

Determination of $P_{eff}$ from $C_{eff}$ by wireless device 14 based on pre-defined 2-level mapping: 2-level

| | Determination of $P_{eff}$ by wireless device | |
|---|---|---|
| Measurement cycle ID | Result of comparing $C_{eff}$ with threshold (H) | Determined $P_{eff}$ |
| 0 | $C_{eff} < 640$ ms | 0 |
| 1 | $C_{eff} \geq 640$ ms | 0.5% |

TABLE 6

Determination of $P_{eff}$ from $C_{eff}$ by wireless device 14 based on pre-defined 3-level mapping

| | Determination of $P_{eff}$ by wireless device | |
|---|---|---|
| Measurement cycle ID | Result of comparing $C_{eff}$ with thresholds (H1 and H2) | Determined $P_{eff}$ |
| 0 | $C_{eff} \leq 320$ ms | 0% |
| 1 | $320$ ms $< C_{eff} \leq 640$ ms | 0.5% |
| 2 | $C_{eff} > 640$ ms | 1% |

In other examples of predefined rules, it may be predefined that when at least two SCCs with deactivated SCells are configured at wireless device 14, the interruptions on the serving cell due to measurements on the SCCs with the deactivated SCells are allowed up to X % probability of missed at least one of ACK and NACK signaling where X is the largest of the probabilities of missed at least one of ACK and NACK signaling corresponding to at least the first measurement cycle and the second measurement cycles used for measuring cells of the SCC$_1$ and SCC$_2$, respectively.

Processor 30 of wireless device 14 is configured to ensure that when transmitting packets between a serving cell and wireless device 14, a serving cell interruption probability of a missed at least one of ACK and NACK signaling in the UL direction does not exceed the determined effective serving cell interruption probability ($P_{eff}$) of a missed at least one of ACK and NACK signaling in the UL direction while performing the measurements on the cells of the first SCC and the second SCC (Block S106). In one or more embodiments, ensuring that the serving cell interruption probability of missed at least one of ACK and NACK signaling in the UL direction does not exceed the determined effective serving cell interruption probability ($P_{eff}$) of missed at least one of ACK and NACK signaling includes processor 30 adapting at least one radio procedure to be performed by the wireless device. For example, wireless device 14 adapting at least one radio procedure may include at least one of:

performing measurements or obtaining measurement samples for measuring on one or more cells of different SCCs with at least deactivated SCells around the same time, e.g., within X ms of each other where X=2 or 3 ms, or during the same time instance, i.e., modifying a measurement sampling of measurements performed on the cells by performing the measurements using first and second measurement cycles during a same time period;

performing measurements or obtaining measurement samples for measuring on one or more cells of different SCCs according to only the effective measurement cycle, e.g., longest of the measurement cycles used for all SCCs, i.e., modifying a measurement sampling of measurements performed on the cells by performing the measurements according to only an effective measurement cycle, Ceff, the Ceff being based on the first measurement cycle and the second measurement cycle;

adapting measurement reporting in time since transmission may also cause interruption;

adapting UL radio signal or channel transmission, e.g., adapt SRS or RACH transmission, where the adapting may include one or more of: adapting UL transmission configuration in time, dropping some of the configured transmissions to avoid the interruption they may cause; and aligning the interruptions caused by the at least two measurement cycles in time, e.g., by adapting a time shift of at least one measurement cycle with respect to another one or of at least two measurement cycles with respect to each other.

In one or more embodiments, the measurements according to the effective measurement cycle, Ceff, are performed such that measurements on the first SCC are performed one of just before, simultaneously with and just after measurements on the second SCC.

Since some of the deactivated SCell measurement cycle configurations are multiples of other DRX cycle configurations, (C1=N×C1 or C2=N×C1), the interruptions may be aligned by performing measurements on deactivated $SCC_1$ 18 around the same time as every Nth measurement on deactivated $SCC_2$ 20, or performing measurements on the deactivated $SCC_2$ 20 around the same time as every Nth measurement on C1. Alternatively, wireless device 14 may measure according to the most demanding measurement cycle $C_{eff}$=Min (C1, C2) and use a suitable L1 filter to ensure the correct L1 measurement period for the other measurement cycle. For example, if $C_1$=160 ms and $C_2$=256 ms, the wireless device measures on both $SCC_1$ and $SCC_2$ according to a 160 ms measurement cycle. The L1 filtering is performed on five samples for $SCC_1$ and for eight samples on $SCC_2$, such that the measurement periods are 800 ms and 1280 ms, respectively. In this case, $SCC_2$ is measured more frequently than the minimum required by the $C_2$ measurement cycle to align the measurement activity between $C_1$ and $C_2$. Then, additional filtering is performed on $C_2$ to ensure that the specification measurement period is still met.

For the existing values defined for Scell measurement cycles (subframes (sf) 160, sf 256, sf 320, sf 512, sf 640, sf 1024, sf 1280) the ratio of deactivated SCell measurement cycles are all ratios as illustrates below in Table 7.

TABLE 7 of ratios of deactivated SCell measurements cycles

| | | Deactivated SCell measurement cycle 2 (C2) (ms) | | | | | | |
|---|---|---|---|---|---|---|---|---|
| | | 160 | 256 | 320 | 512 | 640 | 1024 | 1280 |
| Deactivated SCell measurement cycle 1 (C1) (ms) | 160 | 1 | 1.6 | 2 | 3.2 | 4 | 6.4 | 8 |
| | 256 | 0.625 | 1 | 1.25 | 2 | 2.5 | 4 | 5 |
| | 320 | 0.5 | 0.8 | 1 | 1.6 | 2 | 3.2 | 4 |
| | 512 | 0.3125 | 0.5 | 0.625 | 1 | 1.25 | 2 | 2.5 |
| | 640 | 0.25 | 0.4 | 0.5 | 0.8 | 1 | 1.6 | 2 |
| | 1024 | 0.15625 | 0.25 | 0.3125 | 0.5 | 0.625 | 1 | 1.25 |
| | 1280 | 0.125 | 0.2 | 0.25 | 0.4 | 0.5 | 0.8 | 1 |

Figure 4:
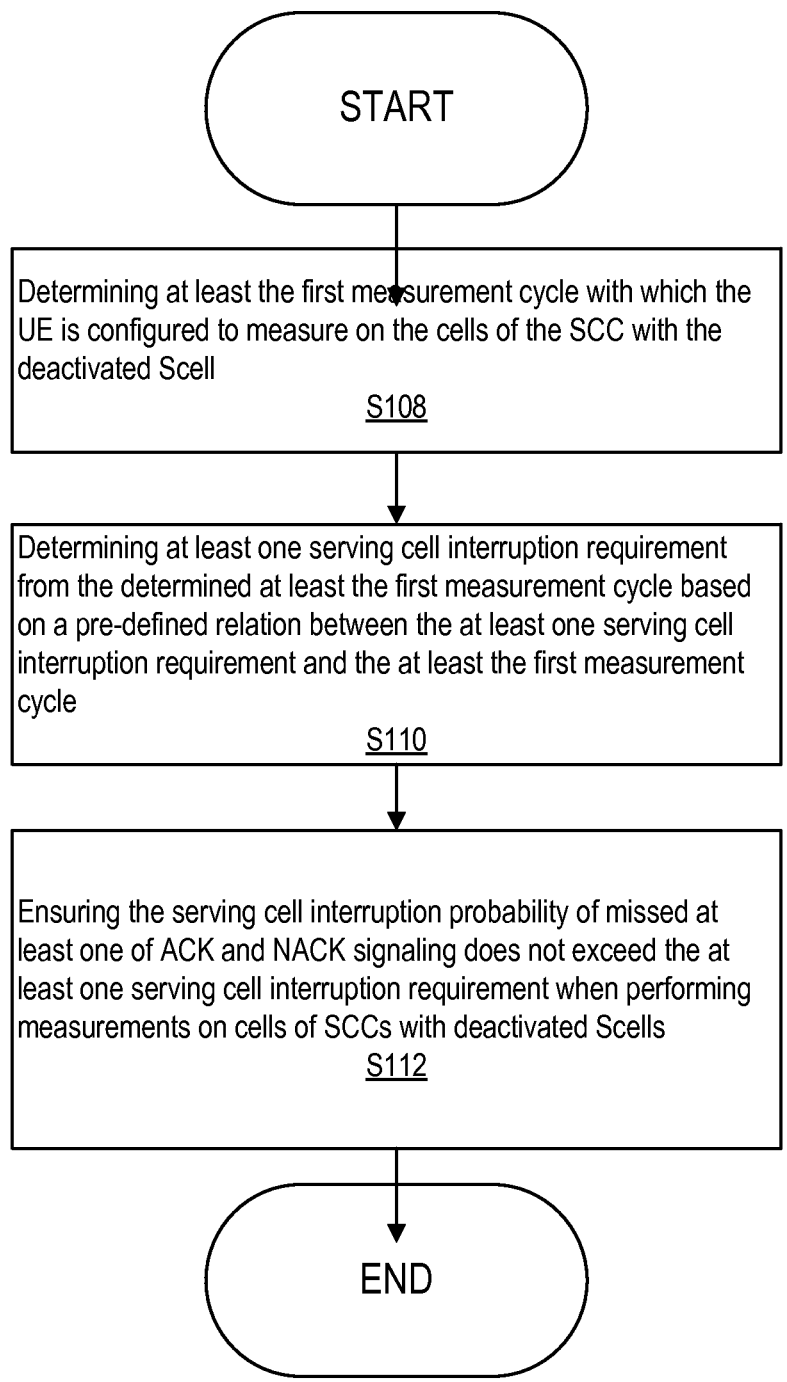
FIG. 4 is signaling flow diagram of an exemplary process of second procedure adapter module for managing serving cell performance in accordance with the principles of the disclosure.

An exemplary signaling flow diagram for a processor performed by second procedure adapter module 25 is illustrated in FIG. 4. Wireless device 14 performs functions according to second procedure adapter module 25 when CA capable wireless device 14 is configured with only one SCC with deactivated SCell and the remaining SCCs with activated SCell. This wireless device 14 configuration is referred to as a fall back mode of operation or first mode of operation. Processor 30 is configured to determine at least the first measurement cycle with which wireless device 14 is configured to measure on the cells of the SCC with the deactivated SCell (Block S108). Processor 30 is configured to determine at least one serving cell interruption requirement from the determined at least the first measurement cycle based on a pre-defined relation between the at least one serving cell interruption requirement and the at least the first measurement cycle (Block S110). Processor 30 is configured to ensure the serving cell interruption probability of missed at least one of ACK and NACK signaling does not exceed the at least one serving cell interruption requirement when performing measurements on cells of SCCs with deactivated SCells (Block S112). In one or more embodiments, the ensuring that the serving cell interruption probability of missed at least one of ACK and NACK signaling does not exceed the at least one serving cell interruption requirement includes adapting at least one procedure as discussed above with respect to Block S106.

In one or more embodiments, the wireless device is served by only the PCell and is one of configured and reconfigured with only the first SCC. Processor 30 may be configured to determine a second effective serving cell interruption probability, Peff2, of missed at least one of Acknowledgement, ACK, and Negative-Acknowledgement, NACK, signaling in an uplink, UL, direction based on the first measurement cycle, and ensure that when transmitting packets between a serving cell and the wireless device, a serving cell interruption probability of a missed at least one of ACK and NACK signaling in the UL direction does not exceed the determined second effective serving cell interruption probability, Peff2, of a missed at least one of ACK and NACK signaling in the UL direction while performing the measurements on the cells of the first SCC. Further, the first measurement cycle and the second measurement cycles are any of: a first SCell measurement cycle and a second SCell measurement cycle used by the wireless device for performing mobility measurements, and a first Positioning Reference Signal, PRS, configuration periodicity and a second PRS configuration periodicity used by the wireless device for performing positioning measurements In one or more embodiments where wireless device 14 is capable of 3 DL CA and is configured with 2 SCCs, the predefined rule for wireless device 14 is as follows:

when only one SCell is activated, then the interruptions on the PCell and the activated SCell due to measurements on SCC with the deactivated SCell are allowed with up to X1% probability of missed at least one of ACK and NACK signaling when the configured measCycleSCell is Y1 ms or longer for the deactivated SCell;

if both SCells are deactivated then the interruptions on the PCell due to measurements on the SCCs with the deactivated SCells are allowed up to X2% probability of missed at least one of ACK and NACK provided that the configured measCycleSCell is Y2 ms or longer for at least one deactivated SCell, where X1=X2=0.5% and Y1=Y2=640 ms, and measCycleSCell is defined 3GPP standards.

Figure 5:
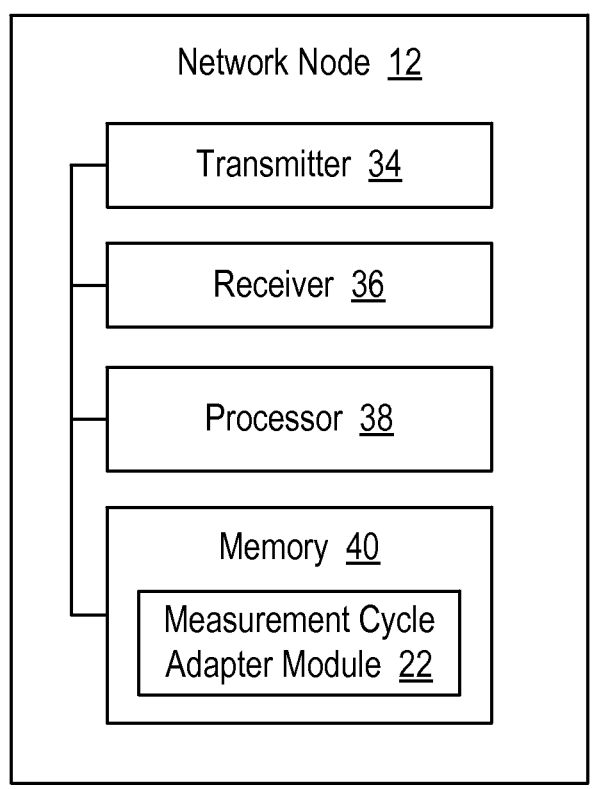
FIG. 5 is a block diagram of an exemplary network node for managing serving cell performance in accordance with the principles of the disclosure.

An exemplary block diagram of network node 12 is illustrated in FIG. 5. Network node 12 may be an eNodeB, RNC, BSC or positioning node, among other node devices. Network node 12 includes transmitter 34 and receiver 36 for communicating with wireless device 14 and other network nodes 12, among other devices. Alternatively, transmitter 12 and receiver 36 may be one or more transceivers. In one or more embodiments, network node 12 may include one or more communication interfaces for communicating with one or more logical nodes. Network node 12 includes one or more processors 38 for performing network node 12 functions as described herein. Network node 12 includes memory 40 in communication with processor 38 in which memory 32 may store one or more modules, programming instructions and data. In one or more embodiments, memory 40 stores measurement cycle adaptor module 22. For example, measurement cycle adaptor module 22 includes program instructions, which when executed by processor 38, cause processor 38 to perform the functions described in detail with respect to FIG. 6.

Figure 6:
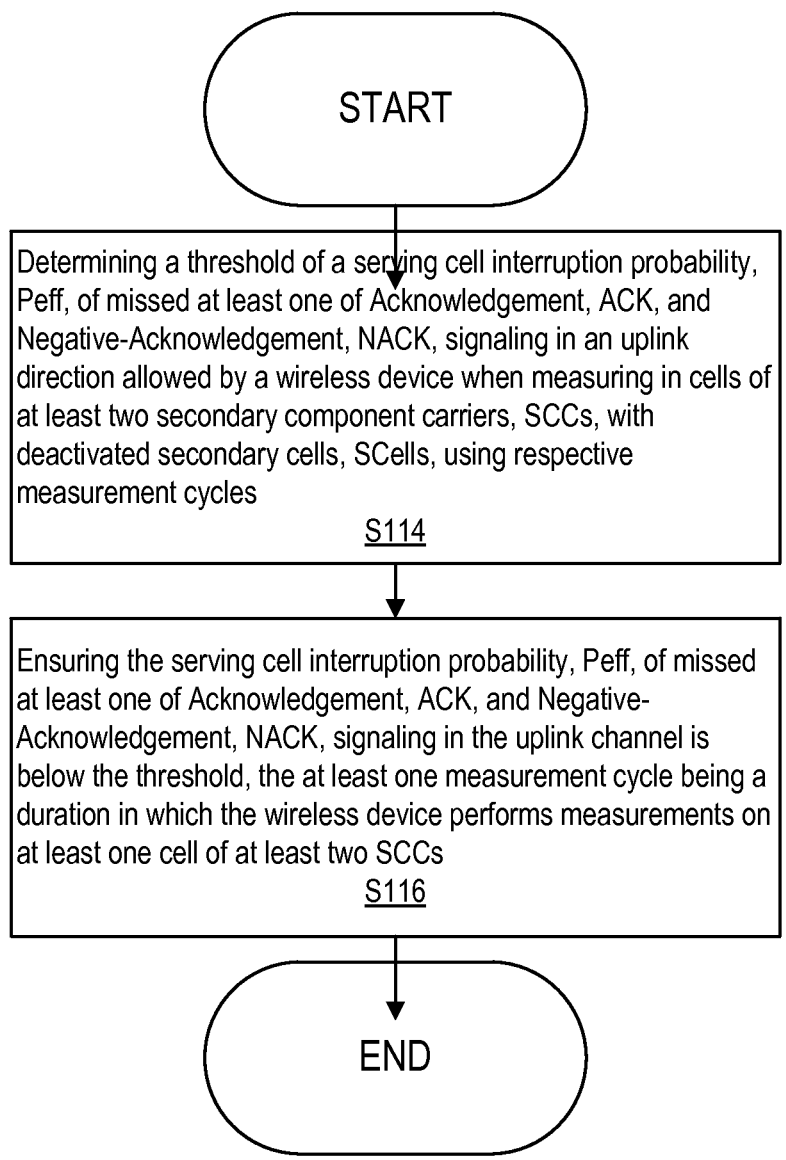
FIG. 6 is a signaling flow diagram of an exemplary process of measurement cycle adapter module in accordance with the principles of the disclosure.

An exemplary signaling flow diagram of a process performed by measurement cycle adaptor module 22 is illustrated in FIG. 6. Processor 38 is configured to determine a threshold of a serving cell interruption probability (Peff) of missed at least one of Acknowledgement, ACK, and Negative-Acknowledgement, NACK, signaling in an uplink direction allowed by wireless device 14 when measuring in cells of at least two secondary component carriers, SCCs, with deactivated secondary cells, SCells, using respective measurement cycles (Block S114). Processor 38 is further configured to ensure that the serving cell interruption probability (Peff) of missed at least one of Acknowledgement, ACK, and Negative-Acknowledgement, NACK, signaling in the uplink channel is below the threshold (Block S116). The at least one measurement cycle is a duration in which wireless device 14 performs measurements on at least one cell of at least two SCCs. In one or more embodiments, the ensuring functions of measurement cycle adaptor module 22 include adapting, modifying or reconfigure at least measurement cycle. In one embodiment, at least one parameter associated with at least one measurement cycle is modified in which the at least one parameter includes at least one of a periodicity of the measurement cycle and a time offset of the measurement cycle. The at least one measurement cycle may include a CA measurement cycle such as a SCell measurement cycle and other measurements such as RSTS, e.g., RSTD measurement configuration received in the OTDOA assistance data by wireless device 14 from network node 12.

For example, at least one of a second network node and a third network node adapts or modifies the first and the second measurement cycles respectively for wireless device 14 that is configured with the at least two SCCs (SCC$_1$ 18 and SCC$_2$ 20) with deactivated SCells. This adaptation or modification ensures that determined level of serving cell performance is met for the PCell and/or for one or more activated SCells. The determined level of the serving cell performance may correspond to interruption impact measure, e.g., certain packet loss rate or serving cell interruption probability of missed at least one of ACK and NACK signalling. For example, network node 12 including both second and third network nodes may configure the measurement cycles for the respective SCCs that would ensure that the serving cell interruption probability of missed at least one of ACK and NACK for PCell and/or SCells is below or equal to a certain threshold, i.e., determined level, such as not larger than 0.5%. The threshold can be determined based on the acceptable level of the serving cell interruption probability of missed at least one of ACK and NACK.

In one or more embodiments, in order to determine how to adapt at least one measurement cycle, processor 38 obtains information related to one or more predefined rules described with respect to Block S104. The obtained information may include Peff and/or Ceff, thereby allowing network node 12 determine the impact of using different measurement cycles on the serving cell performance. Further, processor 38 determines at least one measurement cycle that ensures the serving cell interruption probability of missed at least one ACK and NACK signaling in the UL direction is below the threshold. For example, processor 38 determines a periodicity, time offset in measurement configuration and/or other parameters of one or more measurement cycles. Processor 38 then selects the determined at least one measurement cycle or modifies/adapts the measurement cycle to the determined measurement cycle in order to ensure that the serving cell interruption probability of missed at least one of ACK and NACK for PCell and/or SCells is below or equal to a certain threshold.

In one or more embodiment, network node 12 determines an effective measurement cycle, Ceff, based on the measurement cycles, determines a serving cell interruption probability, Peff, based on the effective measurement cycle, Ceff, in which the modified at least one measurement cycle is based on the determined serving cell interruption probability, Peff. The effective measurement cycle periodicity, Ceff, is based on at least one of a minimum function and maximum function applied to the measurement cycles. Further, the determining of the serving cell probability, Peff, may include mapping the effective measurement cycle periodicity, Ceff, to a predefined serving cell interruption probability, Peff. In one or more embodiment, the at least one measurement cycle is any of: a SCell measurement cycle used by the wireless device for performing mobility measurements, and a PRS configuration periodicity used by the wireless device for performing positioning measurements.

Figure 7:
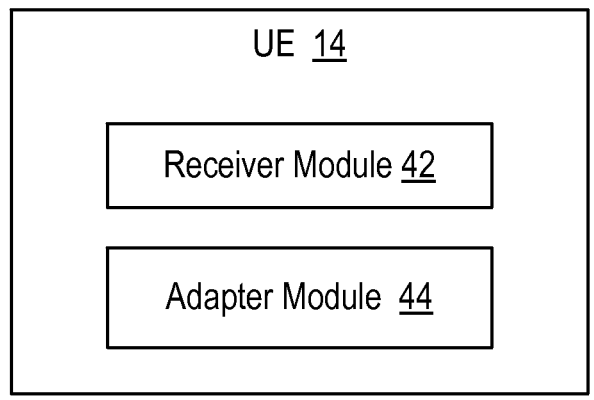
FIG. 7 is an alternative block diagram of the wireless device in accordance with the principles of the disclosure.
Figure 8:
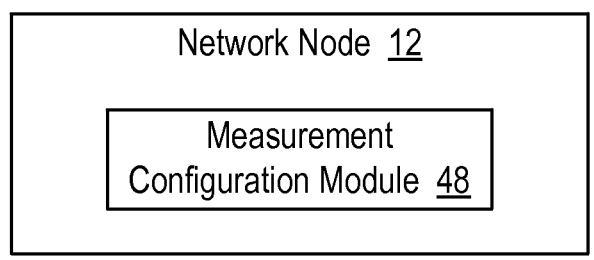
FIG. 8 is an alternative block diagram of the network node in accordance with the principles of the disclosure.

An exemplary alternative embodiment of wireless device 14 is illustrated in FIG. 7. In particular, wireless device 14 includes receiver module 42 that is configured to perform the functions of Blocks S100 and S102 as described above. Further, wireless device 14 includes adaptor module 44 that is configured to perform the functions of Blocks S104 and S106 as described above. An exemplary alternative embodiment of network node 12 is illustrated in FIG. 8. Network node 12 includes measurement configuration module 48 that is configured to perform the functions of Blocks S114 and 116.

In the following some exemplary embodiments of the teaching described herein are explained.

APPENDIX A 7.8 Interruptions with Carrier Aggregation
7.8.1 Introduction
This section contains the requirements related to the interruptions on:
    PCell that are allowed for a E-UTRA CA capable UE when one or two SCells are configured, deconfigured, activated or deactivated or
    PCell and a SCell that are allowed for a E-UTRA CA capable UE when the other SCell is configured, deconfigured, activated or deactivated.
Note: interruptions at SCell addition/release, activation/deactivation and during measurements on SCC may not be required by all UEs.
Editor's Note: The interruptions shall not interrupt RRC signalling or ACK/NACKs related to RRC reconfiguration procedure [2] for SCell addition/release or MAC control signalling [36.321] for SCell activation/deactivation command. How to specify this is FFS.
7.8.2 Requirements
7.8.2.1 Interruptions at SCell addition/release for intra-band CA
When an intra-band SCell is added or released as defined in [2] the UE is allowed an interruption of up to 5 subframes on PCell during the RRC reconfiguration procedure [2]. This interruption is for both uplink and downlink of PCell.
7.8.2.2 Interruptions at SCell addition/release for inter-band CA When an inter-band SCell is added or released as defined in [2] the UE that requires interrupt is allowed an interruption of up to [1] subframe on PCell during the RRC reconfiguration procedure [2]. This interruption is for both uplink and downlink of PCell.

7.8.2.3 Interruptions at SCell activation/deactivation for intra-band CA

When an intra-band SCell is activated or deactivated as defined in [2] the UE is allowed an interruption of up to 5 subframes on PCell during the activation/deactivation procedure [2] delay—defined in Section 7.7. This interruption is for both uplink and downlink of PCell.

7.8.2.4 Interruptions at SCell activation/deactivation for inter-band CA

When an inter-band SCell is activated or deactivated as defined in [2] the UE that requires interrupt is allowed an interruption of up to [1] subframe on PCell during the activation/deactivation procedure [2]—defined in Section 7.7. This interruption is for both uplink and downlink of PCell.

7.8.2.5 Interruptions during measurements on SCC for intra-band CA

PCell interruptions due to measurements on SCC when the SCell is deactivated are allowed with up to 0.5% probability of missed ACK/NACK when the configured measCycleSCell[2] is 640 ms or longer. Each interruption shall not exceed 5 subframes.

7.8.2.6 Interruptions during measurements on SCC for inter-band CA

PCell interruptions due to measurements on SCC when the SCell is deactivated are allowed with up to 0.5% probability of missed ACK/NACK when the configured measCycleSCell[2] is 640 ms or longer. Each interruption shall not exceed 1 subframe.

7.8.2.7 Interruptions at SCell addition/release for intra-band CA with two downlink SCells When an intra-band SCell is added or released as defined in [2] the UE is allowed an interruption of up to 5 subframes on PCell and the other activated SCell during the RRC reconfiguration procedure [2]. This interruption is for both uplink and downlink of PCell and the other activated SCell.

7.8.2.8 Interruptions at SCell addition/release for inter-band CA with two downlink SCells When an inter-band SCell is added or released as defined in [2] the UE that requires interrupt is allowed an interruption of up to [1] subframe on PCell and the other activated SCell during the RRC reconfiguration procedure [2]. This interruption is for both uplink and downlink of PCell and the other activated SCell.

7.8.2.9 Interruptions at SCell addition/release for combined intra-band and inter-band CA with two downlink SCells When a SCell is added or released as defined in [2] the UE is allowed an interruption:
 on PCell according to section 7.8.2.7 provided that the SCell and the PCell are in the same frequency band or according to section 7.8.2.8 provided that the SCell and the PCell are in different frequency bands, and
 on the other activated SCell according to section 7.8.2.7 provided that both SCells are in the same frequency band or according to section 7.8.2.8 provided that the two SCells are in different frequency bands.

This interruption is for both uplink and downlink of PCell and the other activated SCell.

7.8.2.10 Interruptions at SCell activation/deactivation for intra-band CA with two downlink SCells When an intra-band SCell is activated or deactivated as defined in [17] the UE is allowed an interruption of up to 5 subframes on PCell and the other activated SCell during the activation/deactivation delay defined in Section 7.7. This interruption is for both uplink and downlink of PCell and the other activated SCell.

7.8.2.11 Interruptions at SCell activation/deactivation for inter-band CA with two downlink SCells When an inter-band SCell is activated or deactivated as defined in [17] the UE that requires interruption is allowed an interruption of up to [1] subframe on PCell and the other activated SCell during the activation/deactivation dlay defined in Section 7.7. This interruption is for both uplink and downlink of PCell and the other activated SCell.

7.8.2.12 Interruptions at SCell activation/deactivation for combined intra-band and inter-band CA with two downlink SCells When a SCell is activated or deactivated as defined in [17] the UE is allowed an interruption:
 on PCell according to section 7.8.2.10 provided that the SCell and the PCell are in the same frequency band or according to section 7.8.2.11 provided that the SCell and the PCell are in different frequency bands, and
 on the other activated SCell according to section 7.8.2.10 provided that both SCells are in the same frequency band or according to section 7.8.2.11 provided that the two SCells are in different frequency bands.

This interruption is for both uplink and downlink of PCell and the other activated SCell.

7.8.2.13 Interruptions during measurements on SCC for intra-band CA with two downlink SCells If only one SCell is activated then the interruptions on the PCell and the activated SCell due to measurements on SCC with the deactivated SCell are allowed with up to 0.5% probability of missed ACK/NACK when the configured measCycleSCell [2] is 640 ms or longer for the deactivated SCell.

If both SCells are deactivated then the interruptions on the PCell due to measurements on the SCCs with the deactivated SCells are allowed up to 0.5% probability of missed ACK/NACK provided that the configured measCycleSCell [2] is 640 ms or longer for at least one deactivated SCell. Each interruption shall not exceed 5 subframes.

7.8.2.14 Interruptions during measurements on SCC for inter-band CA with two downlink SCells If only one SCell is activated then the interruptions on the PCell and the activated SCell due to measurements on SCC with the deactivated SCell are allowed with up to 0.5% probability of missed ACK/NACK when the configured measCycleSCell [2] is 640 ms or longer for the deactivated SCell.

If both SCells are deactivated then the interruptions on the PCell due to measurements on the SCCs with the deactivated SCells are allowed up to 0.5% probability of missed ACK/NACK provided that the configured measCycleSCell [2] is 640 ms or longer for at least one deactivated SCell. Each interruption shall not exceed 1 subframe.

7.8.2.15 Interruptions during measurements on SCC for combined intra-band and inter-band CA with two downlink SCells The UE shall meet the PCell interruption requirements according to section 7.8.2.13 provided that the PCell and at least one of the deactivated SCells are in the same frequency band.

The UE shall meet the PCell interruption requirements according to section 7.8.2.14 provided that the PCell and the two deactivated SCells are in different frequency bands.

The UE shall meet the interruption requirements for an activated SCell according to section 7.8.2.13 provided that the activated SCell and the deactivated SCell are in the same frequency band.

The UE shall meet the interruption requirements for an activated SCell according to section 7.8.2.14 provided that the activated SCell and the deactivated SCell are in different frequency bands.

APPENDIX B 7.1 UE Transmit Timing
7.1.1 Introduction
The UE shall have capability to follow the frame timing change of the connected eNode B. The uplink frame transmission takes place $(N_{TA}+N_{TA\ offset})\times T_s$ before the reception of the first detected path (in time) of the corresponding downlink frame from the reference cell. The UE shall be configured with a pTAG containing the PCell. The pTAG may also contain one SCell or two SCells, if configured. The UE capable of supporting multiple timing advance [2] may also be configured with one sTAG, in which case:
- the pTAG shall contain one PCell and the sTAG shall contain one SCell with configured uplink or
- the pTAG shall contain one PCell and the sTAG shall contain two SCells with configured uplink
- the pTAG shall contain one PCell and one SCell and the sTAG shall contain one SCell with configured uplink In pTAG, UE shall use the PCell as the reference cell for deriving the UE transmit timing for cells in the pTAG. When the UE capable of supporting multiple timing advance [2] is configured with an sTAG, the UE shall use the activated SCell from the sTAG for deriving the UE transmit timing for cell in the sTAG. UE initial transmit timing accuracy, maximum amount of timing change in one adjustment, minimum and maximum adjustment rate are defined in the following requirements. The requirements in clause 7 apply to both TAGs.

7.7 SCell Activation and Deactivation Delay for E-UTRA Carrier Aggregation
7.7.1 Introduction
This section defines requirements for the delay within which the UE shall be able to activate a deactivated SCell and deactive an activated SCell in E-UTRA carrier aggregation. The requirements are applicable to an E-UTRA carrier aggregation capable UE which has been configured with one downlink SCell or two downlink SCells. The requirements shall apply for both E-UTRA FDD and TDD.

7.7.2 SCell Activation Delay Requirement for Deactivated SCell
The requirements in this section shall apply for the UE configured with one downlink SCell.
The delay within which the UE shall be able to activate the deactivated SCell depends upon the specified conditions.
Upon receiving SCell activation command in subframe n, the UE shall be capable to transmit valid CSI report and apply actions related to the activation command as specified in [17] for the SCell being activated no later than in subframe n+24 provided the following conditions are met for the SCell:
- During the period equal to max([5] measCycleSCell, [5] DRX cycles) before the reception of the SCell activation command:
  - the UE has sent a valid measurement report for the SCell being activated and
  - the SCell being activated remains detectable according to the cell identification conditions specified in section 8.3.3.2,
- SCell being activated also remains detectable during the SCell activation delay according to the cell identification conditions specified in section 8.3.3.2.

Otherwise upon receiving the SCell activation command in subframe n, the UE shall be capable to transmit valid CSI report and apply actions related to the activation command as specified in [17] for the SCell being activated no later than in subframe n+34 provided the SCell can be successfully detected on the first attempt.

If there is no reference signal received for the CSI measurement over the delay corresponding to the minimum requirements specified above, then the UE shall report corresponding valid CSI for the activated SCell on the next available uplink reporting resource after receiving the reference signal.

If there are no uplink resources for reporting the valid CSI in subframe n+24 or n+34 then the UE shall use the next available uplink resource for reporting the corresponding valid CSI.

The valid CSI is based on the UE measurement and corresponds to any CQI value specified in [3] with the exception of CQI index=0 (out of range) provided:
- the conditions in section 7.7 are met over the entire SCell activation delay and
- the conditions for CQI reporting defined in Section 7.2.3 [3] are met.

In addition to CSI reporting defined above, UE shall also apply other actions related to the activation command specified in [17] for an SCell at the first opportunities for the corresponding actions once the SCell is activated.

The PCell interruption specified in section 8.3.3 shall not occur before subframe n+5 and not occur after subframe n+9 for E-UTRA FDD.

The PCell interruption specified in section 8.3.3 shall not occur before subframe n+5 and not occur after subframe n+11 for E-UTRA TDD.

Starting from subframe n+9 for E-UTRA FDD UE or subframe n+11 for E-UTRA TDD UE and until the UE has completed the SCell activation, the UE shall send CSI with CQI index=0 (out of range) if the UE is configured to report the CQI in SCell.

7.7.3 SCell Deactivation Delay Requirement for Activated SCell
The requirements in this section shall apply for the UE configured with one downlink SCell.
Upon receiving SCell deactivation command or upon expiry of the sCellDeactivationTimer in subframe n, the UE shall accomplish the deactivation actions specified in [17] for the SCell being deactivated no later than in subframe n+8.

The PCell interruption specified in section 8.3.3 shall not occur before subframe n+5 and not occur after subframe n+9 for E-UTRA FDD.

The PCell interruption specified in section 8.3.3 shall not occur before subframe n+5 and not occur after subframe n+11 for E-UTRA TDD.

7.7.4 SCell Activation Delay Requirement for Deactivated SCell with Two Downlnk SCells
The requirements in this section shall apply for the UE configured with two downlink SCells.
While activating a SCell if the other SCell is not activated or deactivated during the SCell activation delay then the UE shall meet the SCell activation delay requirements specified in section 7.7.2.

While activating a SCell if the other SCell is activated or deactivated then the UE shall meet the SCell activation delay requirements ($T_{activate\_total}$) according to the following expression:

$$T_{activate\_total}=T_{activate\_basic}+K*D_{interrupt}+K*\Delta$$

Where:
$T_{activate\_basic}$ is the SCell activation delay specified in section 7.7.2;
K is the number of times the other SCell is activated, deactivated, configured or deconfigured while the SCell is being activated;
$D_{interrupt}$ is the maximum of the PCell and SCell interruption times specified in section 7.8.
$\Delta$ is the margin to account for resuming the SCell deactivation after each interruption.

7.7.5 SCell Deactivation Delay Requirement for Activated SCell with Two Downlink SCells
The requirements in this section shall apply for the UE configured with two downlink SCells.
While deactivating a SCell if the other SCell is not activated or deactivated during the SCell deactivation delay then the UE shall meet the SCell deactivation delay requirements specified in section 7.7.3.
While deactivating a SCell if the other SCell is activated or deactivated then the UE shall meet the SCell activation delay requirements ($T_{deactivate\_total}$) according to the following expression:

$$T_{deactivate\_total}=T_{deactivate\_basic}+L*D_{interrupt}+L*\Delta$$

Where:
$T_{deactivate\_basic}$ is the SCell activation delay specified in section 7.7.3;
L is the number of times the other SCell is activated, deactivated, configured or deconfigured while the SCell is being activated;
$D_{interrupt}$ is the maximum of the PCell and SCell interruptions specified in section 7.8.
$\Delta$ is the margin to account for resuming the SCell deactivation after each interruption.

7.8 Interruptions with Carrier Aggregation
7.8.1 Introduction
This section contains the requirements related to the interruptions on:
  PCell that are allowed for a E-UTRA CA capable UE when one or two SCells are configured, deconfigured, activated or deactivated or
  PCell and a SCell that are allowed for a E-UTRA CA capable UE when the other SCell is configured, deconfigured, activated or deactivated.
Note: interruptions at SCell addition/release, activation/deactivation and during measurements on SCC may not be required by all UEs.
Editor's Note: The interruptions shall not interrupt RRC signalling or ACK/NACKs related to RRC reconfiguration procedure [2] for SCell addition/release or MAC control signalling [36.321] for SCell activation/deactivation command. How to specify this is FFS.
7.8.2 Requirements
7.8.2.1 Interruptions at SCell addition/release for intra-band CA
When an intra-band SCell is added or released as defined in [2] the UE is allowed an interruption of up to 5 subframes on PCell during the RRC reconfiguration procedure [2]. This interruption is for both uplink and downlink of PCell.

7.8.2.2 Interruptions at SCell addition/release for inter-band CA
When an inter-band SCell is added or released as defined in [2] the UE that requires interrupt is allowed an interruption of up to [1] subframe on PCell during the RRC reconfiguration procedure [2]. This interruption is for both uplink and downlink of PCell.
7.8.2.3 Interruptions at SCell activation/deactivation for intra-band CA
When an intra-band SCell is activated or deactivated as defined in [2] the UE is allowed an interruption of up to 5 subframes on PCell during the activation/deactivation procedure [2] delay—defined in Section 7.7. This interruption is for both uplink and downlink of PCell.
7.8.2.4 Interruptions at SCell activation/deactivation for inter-band CA
When an inter-band SCell is activated or deactivated as defined in [2] the UE that requires interrupt is allowed an interruption of up to [1] subframe on PCell during the activation/deactivation procedure [2]—defined in Section 7.7. This interruption is for both uplink and downlink of PCell.
7.8.2.5 Interruptions during measurements on SCC for intra-band CA
PCell interruptions due to measurements on SCC when the SCell is deactivated are allowed with up to 0.5% probability of missed ACK/NACK when the configured measCycleSCell[2] is 640 ms or longer. Each interruption shall not exceed 5 subframes.
7.8.2.6 Interruptions during measurements on SCC for inter-band CA
PCell interruptions due to measurements on SCC when the SCell is deactivated are allowed with up to 0.5% probability of missed ACK/NACK when the configured measCycleSCell[2] is 640 ms or longer. Each interruption shall not exceed 1 subframe.
7.8.2.7 Interruptions at SCell addition/release for intra-band CA with two downlink SCells
When an intra-band SCell is added or released as defined in [2] the UE is allowed an interruption of up to 5 subframes on PCell and the other activated SCell during the RRC reconfiguration procedure [2]. This interruption is for both uplink and downlink of PCell and the other activated SCell.
7.8.2.8 Interruptions at SCell addition/release for inter-band CA with two downlink SCells
When an inter-band SCell is added or released as defined in [2] the UE that requires interrupt is allowed an interruption of up to [1] subframe on PCell and the other activated SCell during the RRC reconfiguration procedure [2]. This interruption is for both uplink and downlink of PCell and the other activated SCell.
7.8.2.9 Interruptions at SCell addition/release for combined intra-band and inter-band CA with two downlink SCells
When a SCell is added or released as defined in [2] the UE is allowed an interruption:
  on PCell according to section 7.8.2.7 provided that the SCell and the PCell are in the same frequency band or according to section 7.8.2.8 provided that the SCell and the PCell are in different frequency bands, and
  on the other activated SCell according to section 7.8.2.7 provided that both SCells are in the same frequency band or according to section 7.8.2.8 provided that the two SCells are in different frequency bands.
This interruption is for both uplink and downlink of PCell and the other activated SCell.

7.8.2.10 Interruptions at SCell activation/deactivation for intra-band CA with two downlink SCells
When an intra-band SCell is activated or deactivated as defined in [17] the UE is allowed an interruption of up to 5 subframes on PCell and the other activated SCell during the activation/deactivation delay defined in Section 7.7. This interruption is for both uplink and downlink of PCell and the other activated SCell.

7.8.2.11 Interruptions at SCell activation/deactivation for inter-band CA with two downlink SCells
When an inter-band SCell is activated or deactivated as defined in [17] the UE that requires interruption is allowed an interruption of up to [1] subframe on PCell and the other activated SCell during the activation/deactivation dlay defined in Section 7.7. This interruption is for both uplink and downlink of PCell and the other activated SCell.

7.8.2.12 Interruptions at SCell activation/deactivation for combined intra-band and inter-band CA with two downlink SCells
When a SCell is activated or deactivated as defined in [17] the UE is allowed an interruption:
    on PCell according to section 7.8.2.10 provided that the SCell and the PCell are in the same frequency band or according to section 7.8.2.11 provided that the SCell and the PCell are in different frequency bands, and
    on the other activated SCell according to section 7.8.2.10 provided that both SCells are in the same frequency band or according to section 7.8.2.11 provided that the two SCells are in different frequency bands.
This interruption is for both uplink and downlink of PCell and the other activated SCell.

7.8.2.13 Interruptions during measurements on SCC for intra-band CA with two downlink SCells
If only one SCell is activated then the interruptions on the PCell and the activated SCell due to measurements on SCC with the deactivated SCell are allowed with up to 0.5% probability of missed ACK/NACK when the configured measCycleSCell [2] is 640 ms or longer for the deactivated SCell.
If both SCells are deactivated then the interruptions on the PCell due to measurements on the SCCs with the deactivated SCells are allowed up to 0.5% probability of missed ACK/NACK provided that the configured measCycleSCell [2] is 640 ms or longer for at least one deactivated SCell. Each interruption shall not exceed 5 subframes.

7.8.2.14 Interruptions during measurements on SCC for inter-band CA with two downlink SCells
If only one SCell is activated then the interruptions on the PCell and the activated SCell due to measurements on SCC with the deactivated SCell are allowed with up to 0.5% probability of missed ACK/NACK when the configured measCycleSCell [2] is 640 ms or longer for the deactivated SCell.
If both SCells are deactivated then the interruptions on the PCell due to measurements on the SCCs with the deactivated SCells are allowed up to 0.5% probability of missed ACK/NACK provided that the configured measCycleSCell [2] is 640 ms or longer for at least one deactivated SCell. Each interruption shall not exceed 1 subframe.

7.8.2.15 Interruptions during measurements on SCC for combined intra-band and inter-band CA with two downlink SCells
The UE shall meet the PCell interruption requirements according to section 7.8.2.13 provided that the PCell and at least one of the deactivated SCells are in the same frequency band.
The UE shall meet the PCell interruption requirements according to section 7.8.2.14 provided that the PCell and the two deactivated SCells are in different frequency bands.
The UE shall meet the interruption requirements for an activated SCell according to section 7.8.2.13 provided that the activated SCell and the deactivated SCell are in the same frequency band.
The UE shall meet the interruption requirements for an activated SCell according to section 7.8.2.14 provided that the activated SCell and the deactivated SCell are in different frequency bands.

In the following some exemplary embodiments of the teaching described herein are explained.

EMBODIMENTS

Embodiment 1

A method in a wireless device, served by a first network node on a primary cell, PCell, the wireless device being capable of using at least two secondary serving cells, SCells, the method comprising:
    receiving a first request to perform a measurement on at least one cell on a first secondary component carrier, SCC, with a deactivated first SCell using at least a first measurement cycle;
    receiving a second request to perform a measurement on at least one cell on a second SCC with a deactivated second SCell using at least a second measurement cycle;
    determining an effective serving cell interruption probability (Peff) of missed ACK/NACK signals in an uplink, UL, based on at least the first measurement cycle and the second measurement cycle; and
    adapting a procedure to ensure that when transmitting packets between a serving cell and the wireless device, a serving cell interruption probability of missed ACK/NACK in the UL does not exceed the determined effective serving cell interruption probability, Peff, of missed ACK/NACK in the UL while performing the measurements on the cells of the first SCC and the second SCC.

Embodiment 2

The method of Embodiment 1, wherein the serving cell is one of the PCell and one or more activated SCells.

Embodiment 3

The method of Embodiment 1, wherein Peff is the max of P1 and P2 where P1 and P2 are interruption probabilities of missed ACK/NACK corresponding to the first and the second measurement cycles.

Embodiment 4

The method of Embodiment 1, wherein adapting the procedure comprises adapting a measurement sampling of measurements performed on the cells and performing the measurements using first and second measurement cycles during the same time period.

Embodiment 5

The method of Embodiment 1, wherein the first and the second requests are received from a second network node and a third network node, respectively.

Embodiment 6

The method of Embodiment 5, wherein the first, second, and third network nodes are co-located at the same site.

Embodiment 7

The method of Embodiment 1, wherein the first and the second requests are received in a same message.

Embodiment 8

A method in a network node, the method comprising:
determining a threshold, Pthresh, of a serving cell interruption probability, Peff, of missed ACK/NACK in an uplink signal allowed by a wireless device when measuring in cells of at least two secondary component carriers, SCC, with deactivated secondary cells, SCells, using respective measurement cycles; and
adapting at least one measurement cycle based on at least one pre-defined rule, the at least one measurement cycle being a duration in which the wireless device performs measurements on at least one cell of at least two SCCs, such that a serving cell interruption probability of missed ACK/NACK in the uplink signal caused by the wireless device remains below the determined threshold, Pthresh.

Embodiment 9

A wireless device, served by a first network node on a primary cell, PCell, the wireless device being capable of using at least two secondary serving cells, SCells, the wireless device comprising:
a receiver module configured to receive:
a first request to perform a measurement on at least one cell on a first secondary component carrier, SCC, with a deactivated first SCell using at least a first measurement cycle; and
a second request to perform a measurement on at least one cell on a second SCC with a deactivated second SCell using at least a second measurement cycle;
a probability determiner module configured to determine an effective serving cell interruption probability (Peff) of missed ACK/NACK signals in an uplink, UL, based on at least the first measurement cycle and the second measurement cycle; and
a procedure adapter module configured to adapt a procedure to ensure that when transmitting packets between a serving cell and the wireless device, a serving cell interruption probability of missed ACK/NACK in the UL does not exceed the determined effective serving cell interruption probability, Peff, of missed ACK/NACK in the UL while performing the measurements on the cells of the first SCC and the second SCC.

Embodiment 10

A network node, comprising:
a threshold determiner module configured to determine a threshold, Pthresh, of a serving cell interruption probability, Peff, of missed ACK/NACK in an uplink signal allowed by a wireless device when measuring in cells of at least two secondary component carriers, SCC, with deactivated secondary cells, SCells, using respective measurement cycles; and
a measurement cycle adaptor module configured to adapt at least one measurement cycle based on at least one pre-defined rule, the at least one measurement cycle being a duration in which the wireless device performs measurements on at least one cell of at least two SCCs, such that a serving cell interruption probability of missed ACK/NACK in the uplink signal caused by the wireless device remains below the determined threshold, Pthresh.

Embodiment 11

A wireless device, served by a first network node on a primary cell, PCell, the wireless device being capable of using at least two secondary serving cells, SCells, the wireless device comprising:
a memory configured to store:
measurement cycle durations;
an effective serving cell interruption probability, Peff; and
a processor configured to:
receive a first request to perform a measurement on at least one cell on a first secondary component carrier, SCC, with a deactivated first SCell using at least a first measurement cycle;
receive a second request to perform a measurement on at least one cell on a second SCC with a deactivated second SCell using at least a second measurement cycle;
determine the effective serving cell interruption probability (Peff) of missed ACK/NACK signals in an uplink, UL, based on at least the first measurement cycle and the second measurement cycle; and
adapt a procedure to ensure that when transmitting packets between a serving cell and the wireless device, a serving cell interruption probability of missed ACK/NACK in the UL does not exceed the determined effective serving cell interruption probability, Peff, of missed ACK/NACK in the UL while performing the measurements on the cells of the first SCC and the second SCC.

Embodiment 12

A network node, comprising:
a memory configured to store:
measurement cycle durations;
a serving cell interruption probability, Peff; and
a threshold, Pthresh, of the serving cell interruption probability;
a processor configured to:
to determine the threshold, Pthresh, of the serving cell interruption probability, Peff, of missed ACK/NACK in an uplink signal allowed by a wireless device when measuring in cells of at least two secondary component carriers, SCC, with deactivated secondary cells, SCells, using respective measurement cycles; and
adapt at least one measurement cycle based on at least one pre-defined rule, the at least one measurement cycle being a duration in which the wireless device performs measurements on at least one cell of at least two SCCs, such that a serving cell interruption probability of missed ACK/NACK in the uplink signal caused by the wireless device remains below the determined threshold, Pthresh Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for use in a wireless device served by a first network node on a primary cell, (PCell), the wireless device being capable of using at least two secondary serving cells, (SCells), the method comprising:
   receiving, by the wireless device on the PCell, a first request to perform a measurement on at least one cell of the at least two SCells on a first secondary component carrier (SCC) with a deactivated first SCell using at least a first measurement cycle;
   receiving, by the wireless device on the PCell, a second request to perform a measurement on at least one cell of the at least two SCells on a second SCC with a deactivated second SCell using at least a second measurement cycle;
   determining an effective serving cell interruption probability (Peff) of missed at least one of Acknowledgement (ACK) and Negative-Acknowledgement (NACK) signaling in an uplink (UL) direction based on at least the first measurement cycle and the second measurement cycle; and
   ensuring that when transmitting packets between a serving cell and the wireless device, a serving cell interruption probability of a missed at least one of ACK and NACK signaling in the UL direction does not exceed the determined effective serving cell interruption probability (Peff) of a missed at least one of ACK and NACK signaling in the UL direction while performing the measurements on the cells of the first SCC and the second SCC.

2. The method of claim 1, wherein the ensuring that the serving cell interruption probability of missed at least one of ACK and NACK signaling in the UL direction does not exceed the determined effective serving cell interruption probability (Peff) of missed at least one of ACK and NACK signaling includes adapting at least one radio procedure to be performed by the wireless device.

3. The method of claim 2, wherein the adapting of at least one radio procedure includes modifying a measurement sampling of measurements performed on the at least one cell of the at least two SCells by performing the measurements using first and second measurement cycles during a same time period.

4. The method of claim 2, wherein the adapting of at least one radio procedure includes modifying a measurement sampling of measurements performed on the at least one cell of the at least two SCells by performing the measurements according to only an effective measurement cycle (Ceff), the Ceff being based on the first measurement cycle and the second measurement cycle.

5. The method of claim 2, wherein the adapting of at least one radio procedure includes modifying a measurement sampling of measurements performed on the at least one cell of the at least two SCells by performing the measurements according to an effective measurement cycle (Ceff), the effective measurement cycle (Ceff), being one of a minimum and maximum periodicity of the first measurement cycle and the second measurement cycle.

6. The method of claim 5, wherein the measurements according to the effective measurement cycle (Ceff) are performed such that measurements on the first SCC are performed one of just before, simultaneously with and just after measurements on the second SCC.

7. The method of claim 2, wherein the adapting of at least one radio procedure includes at least one of modifying measurement reporting, modifying UL transmission configuration in time and dropping at least one UL transmission.

8. The method of claim 1, wherein determining the serving cell interruption probability (Peff) includes determining an effective measurement cycle periodicity (Ceff), the Ceff being based on the first measurement cycle and the second measurement cycle; and
   the serving cell interruption probability (Peff) being determined based on the effective measurement cycle periodicity (Ceff).

9. The method of claim 8, wherein the effective measurement cycle periodicity (Ceff) is based on at least one of a minimum function and maximum function applied to a periodicity of the first measurement cycle and a periodicity of the second measurement cycle.

10. The method of claim 1, wherein determining the serving cell interruption probability (Peff) includes:
    determining an effective measurement cycle periodicity (Ceff), the Ceff being based on the first measurement cycle and the second measurement cycle; and
    mapping the effective measurement cycle periodicity (Ceff) to the effective cell interruption probability (Peff).

11. The method of claim 1, wherein the first measurement cycle is used by the wireless device for performing one of mobility measurements and positioning measurements on the first SCC; and
    the second measurement cycle is used by the wireless device for performing one of mobility measurements and positioning measurements.

12. The method of claim 1, wherein the serving cell is one of the PCell and at least one activated SCell.

13. The method of the claim 1, wherein the wireless device is served by only the PCell and is one of configured and reconfigured with only the first SCC, the method further comprising:
    determining a second effective serving cell interruption probability (Peff2) of missed at least one of Acknowledgement (ACK) and Negative-Acknowledgement (NACK) signaling in an uplink (UL) direction based on the first measurement cycle; and ensuring that when transmitting packets between a serving cell and the wireless device, a serving cell interruption probability of a missed at least one of ACK and NACK signaling in the UL direction does not exceed the determined second effective serving cell interruption probability (Peff2) of a missed at least one of ACK and NACK signaling in the UL direction while performing the measurements on the at least one cell of the at least two SCells of the first SCC.

14. The method of claim 13, wherein the first measurement cycle and the second measurement cycles are any of:
first SCell measurement cycle and a second SCell measurement cycle used by the wireless device for performing mobility measurements; and
a first Positioning Reference Signal (PRS) configuration periodicity and a second PRS configuration periodicity used by the wireless device for performing positioning measurements.

15. A wireless device served by a first network node on a primary cell (PCell), the wireless device being capable of using at least two secondary serving cells (SCell), the wireless device comprising:
a receiver configured to:
receive, on the PCell, a first request to perform a measurement on at least one cell of the at least two SCells on a first secondary component carrier (SCC), with a deactivated first SCell using at least a first measurement cycle;
receive, on the PCell, a second request to perform a measurement on at least one cell of the at least two SCells on a second SCC with a deactivated second SCell using at least a second measurement cycle;
a processor;
a memory configured to store computer instructions that, when executed by the processor, cause the processor to:
determine an effective serving cell interruption probability (Peff), of missed at least one of Acknowledgement (ACK) and Negative-Acknowledgement (NACK) signaling in an uplink (UL) direction based on at least the first measurement cycle and the second measurement cycle; and
ensure that when transmitting packets between a serving cell and the wireless device, a serving cell interruption probability of missed at least one of ACK and NACK signaling in the UL direction does not exceed the determined effective serving cell interruption probability (Peff) of missed at least one of ACK and NACK signaling in the UL direction while performing the measurements on the cells of the first SCC and the second SCC.

16. The wireless device of claim 15, further comprising a memory configured to store measurement cycle durations and the effective serving cell interruption probability.

17. The wireless device of claim 15, wherein the ensuring that the serving cell interruption probability of missed at least one of ACK and NACK signaling in the UL direction does not exceed the determined effective serving cell interruption probability (Peff) of missed at least one of ACK and NACK signaling includes adapting at least one radio procedure performed by the wireless device.

18. The wireless device of claim 17, wherein the adapting of at least one radio procedure includes modifying a measurement sampling of measurements performed on the at least one cell of the at least two SCells by performing the measurements using first and second measurement cycles during a same time period.

19. The wireless device of claim 17, wherein the adapting of at least one radio procedure includes modifying a measurement sampling of measurements performed on the at least one cell of the at least two SCells by performing the measurements according to only an effective measurement cycle (Ceff), the Ceff being based on the first measurement cycle and the second measurement cycle.

20. The wireless device of claim 17, wherein the adapting of at least one radio procedure includes modifying a measurement sampling of measurements performed on the at least one cell of the at least two SCells by performing the measurements according to an effective measurement cycle (Ceff), the Ceff being one of a minimum and maximum periodicity of the first measurement cycle and the second measurement cycle.

21. The wireless device of claim 20, wherein the measurements according to the effective measurement cycle (Ceff) are performed such that measurements on the first SCC are performed one of just before, simultaneously with and just after measurements on the second SCC.

22. The wireless device of claim 17, wherein the adapting of at least one radio procedure includes at least one of modifying measurement reporting, modifying UL transmission configuration in time and dropping at least one UL transmission.

23. The wireless device of claim 15, wherein determining the serving cell interruption probability (Peff) includes determining an effective measurement cycle periodicity (Ceff), the Ceff being based on the first measurement cycle and the second measurement cycle; and
the serving cell interruption probability (Peff) being determined based on the effective measurement cycle periodicity (Ceff).

24. The wireless device of claim 23, wherein the effective measurement cycle periodicity (Ceff), is based on at least one of a minimum function and maximum function applied to a periodicity of the first measurement cycle and a periodicity of the second measurement cycle.

25. The wireless device of claim 15, wherein determining the serving cell interruption probability (Peff) includes:
determining an effective measurement cycle periodicity (Ceff), the Ceff being based on the first measurement cycle and the second measurement cycle; and
mapping the effective measurement cycle periodicity (Ceff) to the effective cell interruption probability (Peff).

26. The wireless device of claim 15, wherein the first measurement cycle is used by the wireless device for performing one of mobility measurements and positioning measurements on the first SCC; and
the second measurement cycle performs one of mobility measurements and positioning measurements.

27. The wireless device of claim 15, wherein the serving cell is one of the PCell and at least one activated SCell.

28. A method in a network node, the method comprising:
determining a threshold of a serving cell interruption probability (Peff) of missed at least one of Acknowledgement (ACK) and Negative-Acknowledgement (NACK) signaling in an uplink direction allowed by a wireless device when measuring in cells of at least two secondary component carriers, SCCs, with deactivated secondary cells (SCells) using respective measurement cycles; and
ensuring the serving cell interruption probability (Peff) of missed at least one of Acknowledgement (ACK) and Negative-Acknowledgement (NACK) signaling in the uplink channel is below the threshold, the measurement cycle being a period with which the wireless device performs measurements on at least one cell of at least two SCCs.

29. The method of claim 28, wherein the ensuring that the serving cell interruption probability (Peff) of missed at least one of Acknowledgement (ACK) and Negative-Acknowledgement (NACK) signaling in the uplink direction is below the threshold includes modifying at least one parameter associated with at least one measurement cycle.

30. The method of claim 28, wherein the at least one parameter includes at least one of a periodicity of the measurement cycle and a time offset of the measurement cycle.

31. The method of claim 29, further comprising:
determining an effective measurement cycle (Ceff) based on the at least one measurement cycle;
determining a serving cell interruption probability (Peff) based on the effective measurement cycle (Ceff); and
the modifying of the at least one measurement cycle being based on the determined serving cell interruption probability (Peff).

32. The method of claim 31, wherein the effective measurement cycle periodicity (Ceff) is based on at least one of a minimum function and maximum function applied to the at least one measurement cycle.

33. The method of claim 31, wherein the determining of the serving cell probability (Peff) includes mapping the effective measurement cycle periodicity (Ceff) to a predefined serving cell interruption probability (Peff).

34. The method of claim 28, wherein the measurement cycle is any of:
a SCell measurement cycle used by the wireless device for performing mobility measurements; and
a positioning reference signal (PRS) configuration periodicity used by the wireless device for performing positioning measurements.

35. A network node, the network node comprising:
a processor;
a memory configured to store:
measurement cycle durations;
a serving cell interruption probability (Peff); and
a threshold (Pthresh) of the serving cell interruption probability; and
computer instructions that, when executed by the processor, cause the processor to:
determine a threshold of a serving cell interruption probability (Peff) of missed at least one of Acknowledgement (ACK) and Negative-Acknowledgement (NACK) signaling in an uplink direction allowed by a wireless device when measuring in cells of at least two secondary component carriers (SCCs) with deactivated secondary cells (SCells), using respective measurement cycles; and
ensure the serving cell interruption probability (Peff) of missed at least one of ACK and NACK signaling in the uplink channel is below the threshold, the measurement cycle being a duration in which the wireless device performs measurements on at least one cell of at least two SCCs.

36. The network node of claim 35, wherein the ensuring that the serving cell interruption probability (Peff) of missed at least one of Acknowledgement (ACK) and Negative-Acknowledgement (NACK) signaling in the uplink direction is below the threshold includes modifying at least one measurement cycle.

37. The network node of claim 36, wherein the memory is further configured to store additional computer instructions that, when executed by the processor, cause the processor to:
determine an effective measurement cycle (Ceff) based on the at least one measurement cycle;
determine a serving cell interruption probability (Peff) based on the effective measurement cycle (Ceff); and
the modifying of the at least one measurement cycle being based on the determined serving cell interruption probability (Peff).

38. The network node of claim 37, wherein the effective measurement cycle periodicity (Ceff) is based on at least one of a minimum function and maximum function applied to the at least one measurement cycle.

39. The network node of claim 37, wherein the determining of the serving cell probability (Peff) includes mapping the effective measurement cycle periodicity (Ceff) to a predefined serving cell interruption probability (Peff).

40. A network node, comprising a measurement configuration module configured to:
determine a threshold (Pthresh) of a serving cell interruption probability (Peff), of missed at least one of Acknowledgement (ACK) and Negative-Acknowledgement (NACK) signaling in an uplink signal allowed by a wireless device when measuring in cells of at least two secondary component carriers (SCC) with deactivated secondary cells (SCells) using respective measurement cycles; and
adapt at least one measurement cycle based on at least one predefined rule, the at least one measurement cycle being a duration in which the wireless device performs measurements on at least one cell of the at least two SCCs, such that a serving cell interruption probability of missed at least one of ACK and NACK signaling in the uplink signal caused by the wireless device remains below the determined threshold (Pthresh).

41. A wireless device, served by a first network node on a primary cell (PCell), the wireless device being capable of using at least two secondary serving cells (SCells), the wireless device comprising:
a receiver module configured to:
receive, on the PCell, a first request to perform a measurement on at least one cell of the at least two SCells on a first secondary component carrier (SCC) with a deactivated first SCell using at least a first measurement cycle; and
receive, on the PCell, a second request to perform a measurement on at least one cell of the at least two SCells on a second SCC with a deactivated second SCell using at least a second measurement cycle;
an adapter module configured to:
determine an effective serving cell interruption probability (Peff) of missed at least one of Acknowledgement (ACK) and Negative-Acknowledgement (NACK) signaling in an uplink (UL) direction based on at least the first measurement cycle and the second measurement cycle; and
ensure that when transmitting packets between a serving cell and the wireless device, a serving cell interruption probability of missed at least one of ACK and NACK signaling in the UL direction does not exceed the determined effective serving cell interruption probability (Peff) of missed at least one of ACK and NACK signaling in the UL direction while performing the measurements on the cells of the first SCC and the second SCC.

* * * * *

UNITED STATES PATENT AND TRADEMARK OFFICE
CERTIFICATE OF CORRECTION

PATENT NO. : 9,763,265 B2
APPLICATION NO. : 14/649456
DATED : September 12, 2017
INVENTOR(S) : Kazmi et al.

It is certified that error appears in the above-identified patent and that said Letters Patent is hereby corrected as shown below:

In the Specification

In Column 8, Line 2, delete "aspect, The" and insert -- aspect, the --, therefor.

In Column 12, Line 39, delete "network node 14" and insert -- network node 12 --, therefor.

In Column 15, Line 51, delete "SCCn," and insert -- $SCC_n$, --, therefor.

In Column 17, Line 12, delete "FIG. 3. wireless" and insert -- FIG. 3. Wireless --, therefor.

In Column 17, Line 34, delete "SCell 16" and insert -- SCell 18 --, therefor.

In Column 17, Lines 38-39, delete "operation. wireless" and insert -- operation. Wireless --, therefor.

In Column 19, Line 60, delete "type. wireless" and insert -- type. Wireless --, therefor.

In Column 23, Line 20, delete "$C_{eff}$=Min" and insert -- $C_{eff}$=min --, therefor.

In Column 24, Line 33, delete "measurements" and insert -- measurements. --, therefor.

In Column 24, Line 56, delete "transmitter 12" and insert -- transmitter 34 --, therefor.

In Column 26, Line 33, delete "116." and insert -- S116. --, therefor.

In Columns 26 & 27, Lines 65-67 & 1-2, delete "When an inter-band SCell is added or released as defined in [2] the UE that requires interrupt is allowed an interruption of up to [1] subframe on PCell during the RRC reconfiguration procedure [2]. This interruption is for both uplink and downlink of PCell." and insert the same at Line 66 as a new sub-point.

In Column 28, Line 9, delete "dlay" and insert -- delay --, therefor.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,763,265 B2

In Column 28, Lines 47-50, delete "SCell due to measurements on SCC with the deactivated SCell are allowed with up to 0.5% probability of missed ACK/NACK when the configured measCycleSCell [2] is 640 ms or longer for the deactivated SCell." and insert the same at Line 46, after "activated" as a continuation sub-point.

In Column 29, Line 29, delete "uplink" and insert -- uplink. --, therefor.

In Column 30, Line 61, delete "Downlnk" and insert -- Downlink --, therefor.

In Column 31, Line 15, delete "7.8." and insert -- 7.8; --, therefor.

In Column 31, Line 40, delete "7.8." and insert -- 7.8; --, therefor.

In Column 33, Line 15, delete "dlay" and insert -- delay --, therefor.

In Column 36, Line 62, delete "Pthresh" and insert -- Pthresh. --, therefor.

In the Claims

In Column 37, Line 30, in Claim 1, delete "cell," and insert -- cell --, therefor.

In Column 37, Line 31, in Claim 1, delete "cells," and insert -- cells --, therefor.